(12) United States Patent
Denton et al.

(10) Patent No.: US 10,410,258 B2
(45) Date of Patent: Sep. 10, 2019

(54) GRAPHICAL USER INTERFACE FOR HIGH VOLUME DATA ANALYTICS

(71) Applicant: Nanigans, Inc., Boston, MA (US)

(72) Inventors: Claude Denton, Lexington, MA (US); Ric Calvillo, Chestnut Hill, MA (US); Joshua Allen Breckman, Arlington, MA (US); Travis Hansen, Southborough, MA (US); Jonathan Palmer, Belmont, MA (US); George Plesko, Concord, MA (US); Keith Wright, Arlington, MA (US)

(73) Assignee: Nanigans, Inc., Boston, MA (US)

( * ) Notice: Subject to any disclaimer, the term of this patent is extended or adjusted under 35 U.S.C. 154(b) by 258 days.

(21) Appl. No.: 15/166,815

(22) Filed: May 27, 2016

(65) Prior Publication Data
US 2016/0364093 A1    Dec. 15, 2016

Related U.S. Application Data

(60) Provisional application No. 62/239,145, filed on Oct. 8, 2015, provisional application No. 62/208,241, filed
(Continued)

(51) Int. Cl.
*G06Q 30/02*      (2012.01)
*G06F 16/248*     (2019.01)
(Continued)

(52) U.S. Cl.
CPC ..... *G06Q 30/0277* (2013.01); *G06F 3/04817* (2013.01); *G06F 3/04842* (2013.01);
(Continued)

(58) Field of Classification Search
CPC .............. G06F 3/0482; G06F 17/245; G06F 17/30554; G06F 17/30572; G06F 3/04817;
(Continued)

(56) References Cited

U.S. PATENT DOCUMENTS 8,402,361 B2   3/2013 Goldberg
9,619,531 B2   4/2017 Wu
(Continued)

OTHER PUBLICATIONS

U.S. Appl. No. 15/166,827, filed May 27, 2016, Denton et al.
(Continued)

*Primary Examiner* — Jennifer N To
*Assistant Examiner* — Amy P Hoang
(74) *Attorney, Agent, or Firm* — Wolf, Greenfield & Sacks, P.C.

(57) ABSTRACT

According to various aspects of the present invention, a user interface capable of effectively manipulating high volumes of data is provided. The system and/or user interface is specially configured to aggregate large data volumes and translate the large data volumes into summary information and incorporate navigable categorizations that enable dynamic selection and visualization of portions of the large data volumes. Such interfaces may be particularly useful for managing large amounts of information, such as ad placement and performance information that is generated within an advertising network associated with ad campaigns. Moreover the integration of such summary menus in detailed visualizations improves information access, limits rendering operations by the system, and enables more efficient retrieval and visualization of information. In some examples, the contextual views limit errors in data entry, for example, by providing contextual visualization for subsequent functions.

18 Claims, 44 Drawing Sheets

Related U.S. Application Data on Aug. 21, 2015, provisional application No. 62/190,451, filed on Jul. 9, 2015, provisional application No. 62/168,303, filed on May 29, 2015.

(51) Int. Cl.
 *G06F 3/0481* (2013.01)
 *G06F 3/0484* (2013.01)
 *G06F 16/26* (2019.01)

(52) U.S. Cl.
 CPC ............ *G06F 16/248* (2019.01); *G06F 16/26* (2019.01); *G06Q 30/0242* (2013.01); *G06Q 30/0244* (2013.01); *G06Q 30/0276* (2013.01)

(58) Field of Classification Search
 CPC ............... G06F 3/0483; G06F 3/04842; G06F 3/04847; G06F 3/0485; G06F 2203/04803; G06Q 30/0277; G06Q 30/0242; G06Q 30/0244; G06Q 30/0276
 See application file for complete search history.

(56) References Cited

U.S. PATENT DOCUMENTS

| | | | |
|---|---|---|---|
| 9,898,753 B2 * | 2/2018 | Lara | ............ G06Q 30/02 |
| 2005/0234960 A1 | 10/2005 | Chickering et al. | |
| 2007/0027758 A1 * | 2/2007 | Collins | ............... G06F 17/2785 |
| | | | 705/14.53 |
| 2008/0270164 A1 * | 10/2008 | Kidder | ................... G06Q 30/02 |
| | | | 705/14.4 |
| 2010/0205521 A1 | 8/2010 | Folting | |
| 2010/0251128 A1 | 9/2010 | Cordasco | |
| 2013/0332387 A1 | 12/2013 | Mirra et al. | |
| 2014/0019842 A1 | 1/2014 | Montagna et al. | |
| 2014/0289036 A1 | 9/2014 | Aurigemma | |
| 2015/0095145 A1 * | 4/2015 | Shulman | ........... G06F 17/30867 |
| | | | 705/14.53 |
| 2015/0213109 A1 | 7/2015 | Kassko et al. | |
| 2015/0370433 A1 | 12/2015 | Lam et al. | |
| 2016/0078005 A1 | 3/2016 | Soos | |
| 2016/0364770 A1 | 12/2016 | Denton et al. | |
| 2016/0364772 A1 | 12/2016 | Denton et al. | |
| 2017/0011418 A1 | 1/2017 | Denton et al. | |
| 2017/0052652 A1 | 2/2017 | Denton et al. | |
| 2017/0262165 A9 | 4/2017 | Calvillo et al. | |
| 2018/0005274 A1 | 1/2018 | Calvillo et al. | |

OTHER PUBLICATIONS

U.S. Appl. No. 15/206,581, filed Jul. 11, 2016, Denton et al.
U.S. Appl. No. 15/243,680, filed Aug. 22, 2016, Denton et al.
U.S. Appl. No. 15/166,852, filed May 27, 2016, Denton et al.

* cited by examiner

Ad Preview

☐ AllModern

[ad image with "Shop Now" button]

AllModern: The Largest Selection of Modern Design Online.

Like  Comment  Share

View Ad Plan

⌐ Nanigans Object Hierarchy    ☐ Creative Details    ○ Targeting

○ Location: United States (US)
↱ Age 30-60
↱ Gender: Female, Male
↱ Custom Audiences: 4.14 LaS
↱ Advanced: kom-fbm-73-30@24-phon...

Age 25-35

Audience

Location: United States (US) 10,000,000

Age: 25-35 8,000,000

| Spend | Impressi... | Clicks | CTR | CPC | Effecti... | A1 (reg) | A2 (ad... | CPA 1 (... | CPA 2 (... | AR1 (r... | AR2 (a... | Purch... | Yield R... | Revenue |
|---|---|---|---|---|---|---|---|---|---|---|---|---|---|---|
| $550.84 | 60,749 | 327 | 0.54% | $1.68 | $9.07 | 96 | 11 | $5.74 | $50.08 | 29.36% | 3.36% | 3 | 74.04% | $407.83 |
| $111.63 | 13,404 | 63 | 0.47% | $1.77 | $8.33 | 19 | 3 | $5.88 | $37.21 | 30.16% | 4.76% | 0 | 0.00% | $0.00 |
| $94.01 | 9,313 | 57 | 0.61% | $1.65 | $10.09 | 19 | 0 | $4.95 | $0.00 | 33.33% | 0.00% | 0 | 0.00% | $0.00 |
| $90.60 | 8,252 | 52 | 0.63% | $1.74 | $10.98 | 11 | 1 | $8.24 | $90.60 | 21.15% | 1.92% | 0 | 0.00% | $0.00 |
| ... | | | | | ... | | ... | ... | ... | | | | ... | |
| $4.29 | 647 | 3 | 0.46% | $1.43 | $6.62 | 0 | 0 | $0.00 | $0.00 | 0.00% | 0.00% | 0 | 0.00% | $0.00 |

*FIG. 22B*

| Summary Placeme... | Placeme... | AI Stage | Image/Vid... | Ad Plan | Budget Pool | Strategy Gro... | Reach | Current... | Current... |
|---|---|---|---|---|---|---|---|---|---|
| 1802069009 | Active | 4 | | Gate Desk F... | Gateway [25] | Gate Desk Fe... | 880000 | $1.80 | CPC |
| 180265 | | | ⌖ View on Facebook | | Gateway [25] | Gate Desk Fe... | 1520000 | $1.80 | CPC |
| 180211 | | | ⌖ View on Facebook Ads Manager<br>▼ Only show this Image/Video (small)<br>✎ Exclude this Image/Video (small)<br>▼ Add Filters | | Gateway [25] | Gate Desk Fe... | 800000 | $1.80 | CPC |
| 1802165987 | Active | 4 | | Gate Desk F... | Gateway [25] | Gate Desk Fe... | 1520000 | $1.80 | CPC |
| ... | | | | ... | | ... | ... | ... | ... |
| 1801112633 | | | | Gate Desk F... | Gateway [25] | Gate Desk Fe... | 1020000 | $1.80 | CPC | nanigans AdEngine

AllModern    Performance Analysis

Placements ▼

Ads that were live today with fees

*FIG. 23A*

| ↓Spend | Impressi... | Clicks | CTR | CPC | Effecti... | A1 (reg) | A2 (ad... | CPA 1(... | CPA 2(... | AR1 (r... | AR2 (a... | Purch... | Yield R... | Revenue |
|---|---|---|---|---|---|---|---|---|---|---|---|---|---|---|
| $550.84 | 60,749 | 327 | 0.54% | $1.68 | $9.07 | 96 | 11 | $5.74 | $50.08 | 29.36% | 3.36% | 3 | 74.04% | $407.83 |
| $111.63 | 13,404 | 63 | 0.47% | $1.77 | $8.33 | 19 | 3 | $5.88 | $37.21 | 30.16% | 4.76% | 0 | 0.00% | $0.00 |
| $94.01 | 9,313 | 57 | 0.61% | $1.65 | $10.09 | 19 | 0 | $4.95 | $0.00 | 33.33% | 0.00% | 0 | 0.00% | $0.00 |
| $90.60 | 8,252 | 52 | 0.63% | $1.74 | $10.98 | 11 | 1 | $8.24 | $90.60 | 21.15% | 1.92% | 0 | 0.00% | $0.00 |
| ... | | | | | ... | | | ... | | | | | ... | |
| $4.28 | 647 | 3 | 0.46% | $1.43 | $6.62 | 0 | 0 | $0.00 | 0.00% | 0.00% | 0.00% | 0 | 0.00% | $0.00 |

*FIG. 23B*

FIG. 24A nanigans AdEngine

AllModern    Performance Analysis
Placements ▶

Ads that were live today with fees

| Summary Placeme... | Placeme... 2422 | AI Stage 2424 | Image/Vid... 2425 | Ad Plan 2426 | Budget Pool 2428 | Strategy Gro... 2429 | Reach | Current... | Current... |
|---|---|---|---|---|---|---|---|---|---|
| 1802063009 | Active | 4 | Like Page | Gate Desk F... 2402 | Gateway [25] | Gate Desk Fe... | 880000 | $1.80 | CPC |
| Ad Preview AllModern | | | | Creative Details | | | | 2404 | |
| | | | | Ad Type: Unpublished Page Post (Link) | | Placement Attributes | | | |
| | | | | Destination Name: Denny Designs to BBB | | Date Created: April 15, 2014 | | | |
| | | | | Creative Ad Set: 5333 | | Date Ended: | | | |
| | | | | Creative Group: Jonathon Adler | | Bid Type: CPC | | | |
| | | | | View on Facebook | | Current Bid: $1.80 | | | |
| | | | | View on Facebook Ads Manager | | FB ad account set budget: $910.40 | | | |
| | | | | View AI Logs | | FB ad account daily budget: $300,000.00 | | | |
| | | | | | | Credit: $0.00 | | | |
| 1801933387 | Active | 4 | | Gate Desk F... | Gateway [25] | Gate Desk Fe... | 1120000 | $1.80 | CPC |
| 1802063993 | Active | 4 | | Gate Desk F... | Gateway [25] | Gate Desk Fe... | 880000 | $1.80 | CPC |

| Spend | Impressi... | Clicks | CTR | CPC | Effecti... | A1 (reg) | A2 (ad... | CPA 1(... | CPA 2(... | AR1 (r... | AR2 (a... | Purch... | Yield R... | Revenue |
|---|---|---|---|---|---|---|---|---|---|---|---|---|---|---|
| $550.84 | 60,749 | 327 | 0.54% | $1.68 | $9.07 | 96 | 11 | $5.74 | $50.08 | 29.36% | 3.36% | 3 | 74.04% | $407.83 |

Placement Structure & Status

AI Stage: 4
Budget Post Gateway 25
Strategy Group: Gate Desk Feed CPC (DLX) Min CPA)
Strategy Group Status: Active
Ad Plan: Gate Desk Feed
FB ad account: fbadvertising@allmodern.com
FB Campaign ID: 6019447153

Targeting

Age: 30-64
Location: US
Gender: Male
Delivery Location: Desktop News Feed
Custom Audience: 4/14 LaS
Inventory Source: FB
Connections Group: Exclude AM FB [38176]
Product Category: 0

FB ad set Name: Nanigans_185_487749_AdSet
FB ad set Status: Active
FB Ad Set ID: 6019447727353
more Reach: 240,000
Demo Set ID: 27504

| $0.80 | 780 | 4 | 0.51% | $1.72 | $8.84 | 2 | 0 | $3.45 | $0.00 | 0.00% | 0.00% | 0 | 0.00% | $0.00 |
| $94.01 | 9,315 | 57 | 0.61% | $1.65 | $10.09 | 19 | 0 | $4.95 | $0.00 | 33.33% | 0.00% | 0 | 0.00% | $0.00 |
| ... | ... | ... | | | | | | ... | | | | | | ... |
| $7.58 | 1,121 | 4 | 0.36% | $1.89 | $6.76 | 3 | 0 | $2.53 | $0.00 | 75.00% | 0.00% | 0 | 0.00% | $0.00 |

FIG. 25B

FIG. 26A gpiesko@nanigans.com

⋮⋮⋮ Data ▽   ▼ Filters   ⊞ Attributes   ⊪ Metrics   ☐ Today

| Spend | Impressi... | Clicks | CTR | CPC | Effecti... | A1 (reg) | A2 (ad...) | CPA 1(... | CPA 2(... | AR1 (f... | AR2 (a... | Purch... | Yield R... | Revenue |
|---|---|---|---|---|---|---|---|---|---|---|---|---|---|---|
| $550.84 | 60,749 | 327 | 0.54% | $1.68 | $9.07 | 96 | 11 | $5.74 | $50.08 | 29.36% | 3.36% | 3 | 74.04% | $407.83 |
| $111.63 | 13,404 | 53 | 0.47% | $1.77 | $8.83 | 19 | 3 | $5.88 | $37.21 | 30.16% | 3.36% | 0 | 0.00% | $0.00 |

| $0.89 | 780 | 4 | 0.51% | $1.72 | $8.84 | 2 | 0 | $3.45 | $0.00 | 0.00% | 0.00% | 0 | 0.00% | $0.00 |
| $94.01 | 9,315 | 57 | 0.61% | $1.65 | $10.09 | 19 | 0 | $4.95 | $0.00 | 33.33% | 0.00% | 0 | 0.00% | $0.00 |
| ••• | ••• | | | | ••• | | | ••• | ••• | | | | ••• | ••• |
| $7.58 | 1,121 | 4 | 0.36% | $1.89 | $6.76 | 3 | 0 | $2.53 | $0.00 | 75.00% | 0.00% | 0 | 0.00% | $0.00 |

View old Placement Details

*FIG. 26B*

| Spend | Impressi... | Clicks | CTR | CPC | Effecti... | A1 (reg) | A2 (ad... | CPA 1(... | CPA 2(... | AR1 (f... | AR2 (a... |
|---|---|---|---|---|---|---|---|---|---|---|---|
| $457.91 | 53,127 | 368 | 0.69% | $1.24 | $8.62 | 105 |  | $4.36 | $91.58 | 28.53% | 1.36% |
| $57.96 | 3,828 | 57 | 0.57% | $1.57 | $15.14 | 7 |  | $8.28 | $0.00 | 18.92% | 0.00% |

Placement Structure & Status

Targeting

AI Stage: 4
Budget: Post Gateway 25
Strategy Group: Gate Desk Feed CPC (DLX) Min CPA)
Strategy Group Status: Active
Ad Plan: Gate Desk Feed
FB ad account: fbadvertising@allmodern.com
FB Campaign ID: 6019447727153
FB ad set Name: Nanigans_185_487749_AdSet
FB ad set Status: Active
FB Ad Set ID: 6019447727353
FB Assigned ID: 6019447846153
more Age: 30-64
Location: US
Gender: Male
Delivery Location: Desktop News Feed
Custom Audience: 4.14 L&S
Inventory Source: FB
Connection Group: Exclude AM FB [361175]
Product Category: 0
Reach: 240,000
Demo Set ID: 27504

| $54.80 | 6,626 | 32 | 0.48% | $0.00 | $1.72 | 13 | 1 | $4.22 | $54.89 | 40.63% | 3.13% |
| $36.16 | 4,501 | 36 | 0.80% | $1.06 | $8.48 | 10 | 0 | $3.82 | $0.00 | 27.78% | 0.00% |

| Spend | Impressi... | Clicks | CTR | CPC | Effecti... | A1 (reg) | A2 (ad... | CPA 1 (... | CPA 2 (... | AR1 (r... | AR2 (a... |
|---|---|---|---|---|---|---|---|---|---|---|---|
| $457.91 | 53,127 | 368 | 0.69% | $1.24 | $8.62 | 105 | | $4.36 | $91.58 | 28.53% | 1.36% |
| $57.96 | 3,828 | 57 | 0.57% | $1.57 | $15.14 | 7 | | $8.28 | $0.00 | 18.92% | 0.00% |

Placement Structure & Status

AI Stage: 4
Budget Post Gateway: 25
Strategy Group: Gate Desk Feed CPC (DLX) Min CPA)
Strategy Group Status: Active
Ad Plan: Gate Desk Feed
FB ad account: fbadvertising@allmodern.com
FB Campaign ID: 6019447727153
FB ad set Name: Nanigans_185_487749_AdSet
FB ad set Status: Active
FB Ad Set ID: 6019447727153
FB Assigned ID: 6019447846153
more Targeting Age: 30-64
Location: US
Gender: Male
Delivery Location: Desktop News Feed
Custom Audience: 4.14 LaS
Inventory Source: FB
Connection Group: Exclude AM FB [38176]
Product Category: 0
Reach: 240,000
Demo Set ID: 27504

| $0.00 | 50 | 0 | 0.00% | $0.00 | $0.00 | 0 | | $0.00 | $0.00 | 0.00% | 0.00% |
| $0.00 | 0 | 0 | 0.00% | $0.00 | $0.00 | 0 | | $0.00 | $0.00 | 0.00% | 0.00% |
| $0.00 | 0 | 0 | 0.00% | $0.00 | $0.00 | 0 | | $0.00 | $0.00 | 0.00% | 0.00% |

GRAPHICAL USER INTERFACE FOR HIGH VOLUME DATA ANALYTICS

RELATED APPLICATIONS

This application claims priority under 35 U.S.C. § 119(e) to U.S. Provisional Application Ser. No. 62/168,303 entitled "GRAPHICAL USER INTERFACE FOR HIGH VOLUME DATA ANALYTICS," filed on May 29, 2015; U.S. Provisional Application Ser. No. 62/190,451 entitled "SYSTEM AND METHOD FOR ACCOUNT INGESTION," filed on Jul. 9, 2015; U.S. Provisional Application Ser. No. 62/208,241 entitled "SYSTEM FOR HIGH VOLUME DATA ANALYTICS AND DATA INGESTION," filed on Aug. 21, 2015; and U.S. Provisional Application Ser. No. 62/239,145 entitled "SYSTEM FOR HIGH VOLUME DATA ANALYTIC INTEGRATION AND CHANNEL-INDEPENDENT ADVERTISEMENT GENERATION," filed on Oct. 8, 2015, each of which applications are incorporated herein by reference in their entirety.

BACKGROUND

Conventional systems provide some features to manage large numbers of placements (e.g., advertisements) and further provide for management of those placements over a number of delivery channels. Some drawbacks to existing systems include the inability to effectively manage and access high data volumes associated with large numbers of active placements. Further difficulties are presented when the active placements cross delivery channels (e.g., social media networks, blogs, live feeds, service sites, etc.). Often, the end user suffers from these difficulties and can be overwhelmed by the volume of information and the inability to drill into relevant information while preserving context.

SUMMARY

According to various aspects of the present invention, a user interface capable of effectively manipulating high volumes of data is provided. The system and/or user interface is specially configured to aggregate large data volumes and translate the large data volumes into summary information and incorporate navigable categorizations that enable dynamic selection and visualization of portions of the large data volumes. Such interfaces may be particularly useful for managing large amounts of information, such as ad placement and performance information that is generated within an advertising network associated with ad campaigns.

For example, according to one embodiment, an interface may be provided that is a data-centric pivot table that allows dynamic navigation into more specific information, such as ad placement information. For instance, a user may be presented an interface that allows a user to navigate through performance analysis data (e.g., ad placement performance information) to locate specific ads and their performance within a hierarchical view. The specific ad information that is displayed may include performance information specific to the filters used to navigate to the specific ad. Such an interface is beneficial, as it permits an advertising manager to quickly locate relevant ad placement details through a data-driven interface. In one embodiment, the interface may include the ability to present an inline summary of the ad placement within a tabular view of the performance data. Summary information associated with the displayed ads may be changed depending on the filters or other user selections within the interface. Such capabilities may permit a user (an advertising manager or other user type that manages ad placements) to quickly locate relevant ads within the user interface that relate to the displayed placement performance data.

According to one aspect, the user interface is specially configured to manage, aggregate, and dynamically select data for visualization responsive to constantly updating data feeds (e.g., live placement data associated with an advertising network). In one example, the dynamic nature of the received data, and allowing a user to selectively control their view of the changing data provides improvement over some conventional systems. In one implementation, a database management component is configured to receive the dynamic data feeds, translate the dynamic data feeds into standardized formats, and group the dynamic data into dynamically selectable and displayable elements.

According to one aspect of the present invention, a visualization interface may be provided that includes a web-enabled pivot table used to analyze and present ad performance data. According to one embodiment, advertisers may use such a pivot table to view, sort through, and visualize multiple dimensions of campaign data. Such tables, according to various embodiments, are configured with the attributes and metrics that matter by adding pre-defined audiences, creative elements, data-related attributes or placement details, followed by the metrics that determine campaign success. Once the selections within the interface have been made, the user may be permitted to simply drag and drop to re-order metrics to create a customized campaign dashboard. Such interfaces may be modified to include a summary view associated with a specific ad within the table based on specific user selections within the pivot table. This permits, for example, a user to selectively create a dashboard using certain metrics while at the same time seeing the specific ad placements and their associated summaries according to the configured dashboard. For instance, if an advertiser wants to see which creative was performing the best, the user is permitted to sort by key metrics (e.g., ROI, LTV, CTR, CPC, etc.) and locate specific summary view information relating to those placements.

According to one aspect, a user interface for generating and displaying high data volume analytics is provided. The user interface comprising a user interface component, executed by at least one processor, operable to display at least one user interface, wherein the at least one user interface is configured to display and accept information associated with a plurality of placements, including: a first view operable to access and display placement metrics associated with the plurality of placements, including information indicating performance information associated with live placements being executed on third party systems; wherein the first view is configured to access the performance information retrieved by at least one application programming interface (API) from the third party systems; wherein the first view is generated in a tabular format and displayed with a plurality of rows associated with respective placements, and each column of the tabular format dynamically configured to be selectable by the user and responsive to selection of data dimensions to limit or expand displayed information; wherein the first view is organized into a first and second portion: the first portion including in a default view, columns for at least a placement identifier, a placement status, an associated image, a first hierarchical layer, a second hierarchical layer, or audience information (e.g., reach); the second portion including in another default view, columns for visualizing or deriving spend information, viewer activity, and revenue from individual placements;

and a divider visualization configured to manipulate a sizing and display number of columns in the first and second portions of the first view; a summary view associated with a respective placement integrated into the first view responsive to user selection in the at least one user interface, wherein the summary view is configured to expand a height of a respective row in the tabular format and display adjacent to a row associated with the respective placement, and wherein the summary view spans the first and portions of the first view.

According to one aspect, a user interface for generating and displaying high data volume analytics is provided. The user interface comprises at least one processor operatively connected to a memory, the at least one processor when executing, is configured to: receive advertising metrics; analyze and group the advertising metrics into a demographic hierarchy; determine summary information for the advertising metrics in each level of the demographic hierarchy (e.g., advertising location, advertising target, advertising type, age group, budget pool, strategy group, ad set, individual placement, gender, custom audience, relationship, among others); generate a summary view including at least a navigable user interface portion, the summary view comprising: a plurality of selectable drawers, each drawer associated with a respective hierarchical group of advertising metrics (e.g., site, budget pool, strategy group, ad set, placement, among other options), wherein the at least one selectable drawer includes a display of a title of a respective hierarchical group; and wherein the at least one selectable drawer is associated with a respective summary view of the advertising metrics within the hierarchical group; and integrate the summary view into a first display of advertising metrics, the first display arranged in a tabular format, responsive to user selection in the user interface, wherein integration into the first display includes expanding a row of the tabular format to accommodate the summary view and spanning the summary view across a plurality of columns of the first view.

According to one embodiment, the at least one processor is configured to display for the plurality of selectable drawers a membership number associated with the respective hierarchical group. According to one embodiment, the user interface further comprises a main body display, wherein the main body display includes selectable data dimensions for respective placements organized by row, wherein the row based organization enables a selectable pivot table display. According to one embodiment, the selectable pivot table display is responsive to user specification of data dimensions, and responsive to user selection the user interface re-renders the pivot table display dynamically. According to one embodiment, the user interface is configured to integrate the summary view into the pivot table display. According to one embodiment, integrating the summary view includes rendering the summary view as a row of the pivot table display. According to one embodiment, rendering the summary view as the row of the pivot table includes expanding a default display width of the row to accommodate the summary view. According to one embodiment, the user interface is further configured to: span the summary view across available columns of the pivot table display.

According to one embodiment, the summary view includes first horizontal menu configure to accept selection of an object hierarchy, object definition, and audience information for the object. According to one embodiment, the summary view includes a default first view rendering the object hierarchy and associated plurality of selectable drawers, each drawer associated with a respective hierarchical group of advertising metrics. According to one embodiment, the plurality of selectable drawers comprise a vertically oriented menu selectable in the summary view to transition a body portion of the summary view between visualizations of respective hierarchy information. According to one embodiment, the summary view includes a first preview portion, an adjacent vertical menu portion, and a body portion for displaying data according to selection in the vertical menu portion. According to one embodiment, the user interface is further configured to generate a portion of a display screen, wherein each data element of a tabular data display is selectable by an end user, and responsive to selection configured to enable dynamic generation of performance information views in the portion of the display screen responsive to user selection of one or more data dimensions (e.g., data fields, data descriptors, metadata fields, etc.).

According to one embodiment, the user interface is further configured to generate at least a portion of a display organizing placement performance information based on multi-dimensional groupings (e.g., selection of multiple data fields, data descriptors, and/or metadata fields) of the placement data. According to one embodiment, the user interface component is further configured to, access historical advertising metrics, display and group the historical advertising metrics into an advertising demographic hierarchy (e.g., advertising location, advertising target, advertising type, age group, budget pool, strategy group, ad set, individual placement, gender, custom audience, relationship, among others). According to one embodiment, the user interface component is configured to, access a first display set of metric data associated with placements under management, partition the first display set of metric data into ordered partitions until a first partition of the ordered partition is capable of being rendered on end user device in a threshold period of time (e.g., <one second), render a visualization of the first display limited to the first partition of placement data and respective data fields from the first display set. According to one embodiment, the user interface is configured to display a scroll tool configured to trigger loading of a second partition of the order partitions responsive to scrolling to the end of the first partition of data. According to one embodiment, the scroll tool is further configured to trigger loading of the second partition of the ordered partitions responsive to approaching the end of the first partition of data (e.g., approaching to three, four, or five rows of data).

According to one aspect a system for generating and displaying a graphical user interface for high volume data analytics is provided. The system comprises at least one processor operatively connected to a memory, the at least one processor when executing, is configured to receive advertising metrics from at least one application programming interface connected to a third party content provider, analyze and group the advertising metrics into an advertising demographic hierarchy, determine summary information for the advertising metrics in each level of the advertising demographic hierarchy (e.g., advertising location, advertising target, advertising type, age group, budget pool, strategy group, ad set, individual placement, gender, custom audience, relationship, among others), and generate a navigable user interface display comprises at least one selectable drawer associated with a hierarchical group of advertising metrics (e.g., site, budget pool, strategy group, ad set, placement, among other options), wherein the at least one selectable drawer includes a display of a title of a respective hierarchical group, wherein the at least one selectable drawer is associated with a respective summary view of the advertising metrics within the hierarchical group, and wherein the at least one processor is further configured to integrate the summary view into a first display of advertising metrics arranged in a tabular format responsive to user selection in a user interface, wherein integration into the first display includes expanding a row of the tabular format to accommodate the summary view and spanning the summary view across a plurality of columns of the first view.

According to one embodiment, the at least one selectable drawer includes a display of a membership number associated with the respective hierarchical group. According to one embodiment, the at least one processor is configured to transition the summary view between a plurality of views responsive to selection in the user interface. According to one embodiment, the summary view includes at least a horizontal menu for transitions views between at least a first set of views for managing hierarchically arranged data associated with the placement, a second set of views for managing creative details (e.g., visualization information (e.g., image, text, description, etc.)) associated with the placement, or a third set of views for managing targeting information (e.g., audience) for the placement.

According to one embodiment, the at least one processor displays a first view responsive to the user selection in the user interface that triggers integration of the summary view. According to one embodiment, the first view is configured to display at least a first portion configured to display an image of an associated placement, a second portion configured to display a vertically oriented menu of a plurality of selectable drawers, a third portion configured to display adjacent to the second portion, wherein content displayed in the third portion is displayed responsive to a selection of one of the plurality of selectable drawers. According to one embodiment, the system is further configured to enable dynamic generation of performance information responsive to user selection of data dimension (e.g., data fields, data descriptors, metadata fields, etc.) and integrate the summary view into the dynamically generated performance information responsive to user selection. According to one embodiment, the system is further configured to generate performance information on multi-dimensional groupings of the advertising data responsive to user selection in the user interface of a plurality of dimensions describing placements.

According to one embodiment, the system further comprises a UI component configured to dynamically generate visual displays on historical advertising metrics responsive to user selection of information dimensions (e.g., descriptive information for the advertisements or information associated with the advertisements) associated with one or more advertisements in the selectable visual interface. According to one embodiment, the UI component is configured to display information dimensions associated with advertisements in a selectable pivot table display. According to one embodiment, the UI component is further configured to display summary information for the advertising metrics in each level of an advertising demographic hierarchy (e.g., advertising location, advertising target, advertising type, age group, budget pool, strategy group, ad set, individual placement, gender, custom audience, relationship, among others). According to one embodiment, the at least one processor is further configured to: access the placement data via an advertising API associated with a social networking provider. (e.g., FACEBOOK, TWITTER, PINTEREST, etc.).

According to one aspect, a method for generating and displaying a graphical user interface for high volume data analytics is provided. The method comprises receiving, by at least one processor, advertising metrics from at least one application programming interface connected to a third party content provider, analyzing and grouping, by the at least one processor, the advertising metrics into an advertising demographic hierarchy, determining, by the at least one processor, summary information for the advertising metrics in each level of the advertising demographic hierarchy (e.g., advertising location, advertising target, advertising type, age group, budget pool, strategy group, ad set, individual placement, gender, custom audience, relationship, among others), generating, by the at least one processor, a navigable user interface display comprising at least one selectable drawer associated with a hierarchical group of advertising metrics (e.g., site, budget pool, strategy group, ad set, placement, among other options), wherein the at least one selectable drawer includes a display of a title of a respective hierarchical group, wherein the at least one selectable drawer is associated with a respective summary view of the advertising metrics within the hierarchical group, and integrating, by the at least one processor, the summary view into a first display of advertising metrics arranged in a tabular format responsive to user selection in a user interface, wherein the act of integrating into the first display includes expanding a row of the tabular format to accommodate the summary view and spanning the summary view across a plurality of columns of the first view.

According to one embodiment, the method further comprises displaying a membership number associated with the respective hierarchical group in the at least one selectable drawer. According to one embodiment, the method further comprises transitioning the summary view between a plurality of views responsive to selection in the user interface. According to one embodiment, the method further comprises transitioning the summary view responsive to selection within at least a horizontal menu specifying transitions between at least a first set of views for managing hierarchically arranged data associated with the placement, a second set of views for managing creative details (e.g., visualization information (e.g., image, text, description, etc.)) associated with the placement, or a third set of views for managing targeting information (e.g., audience) for the placement. According to one embodiment, the method further comprises displaying a first view responsive to the user selection in the user interface that triggers integration of the summary view. According to one embodiment, the method further comprises an act of displaying within the first view at least one of a first portion configured to display an image of an associated placement, a second portion configured to display a vertically oriented menu of a plurality of selectable drawers, a third portion configured to display adjacent to the second portion, wherein content displayed in the third portion is displayed responsive to a selection of one of the plurality of selectable drawers. According to one embodiment, the method further comprises generating dynamically performance information responsive to user selection of at least one data dimension (e.g., data fields, data descriptors, metadata fields, etc.) and integrating the summary view into the dynamically generated performance information responsive to user selection. According to one embodiment, generating dynamically includes generating performance information on multi-dimensional groupings responsive to user selection in the user interface of a plurality of dimensions describing placements.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE FIGURES

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIGS. 5-13 are example views of user interfaces, according to some embodiments;

FIGS. 14-21 are example views of user interfaces, according to some embodiments;

FIGS. 22A-B are an example view of a user interface, according to one embodiment;

FIGS. 23A-B are an example view of a user interface, according to one embodiment;

FIGS. 24A-B are an example view of a user interface, according to one embodiment;

FIGS. 25A-B are an example view of a user interface, according to one embodiment;

FIGS. 26A-B are an example view of a user interface, according to one embodiment;

FIGS. 27A-B are an example view of a user interface, according to one embodiment;

Figure 28A:
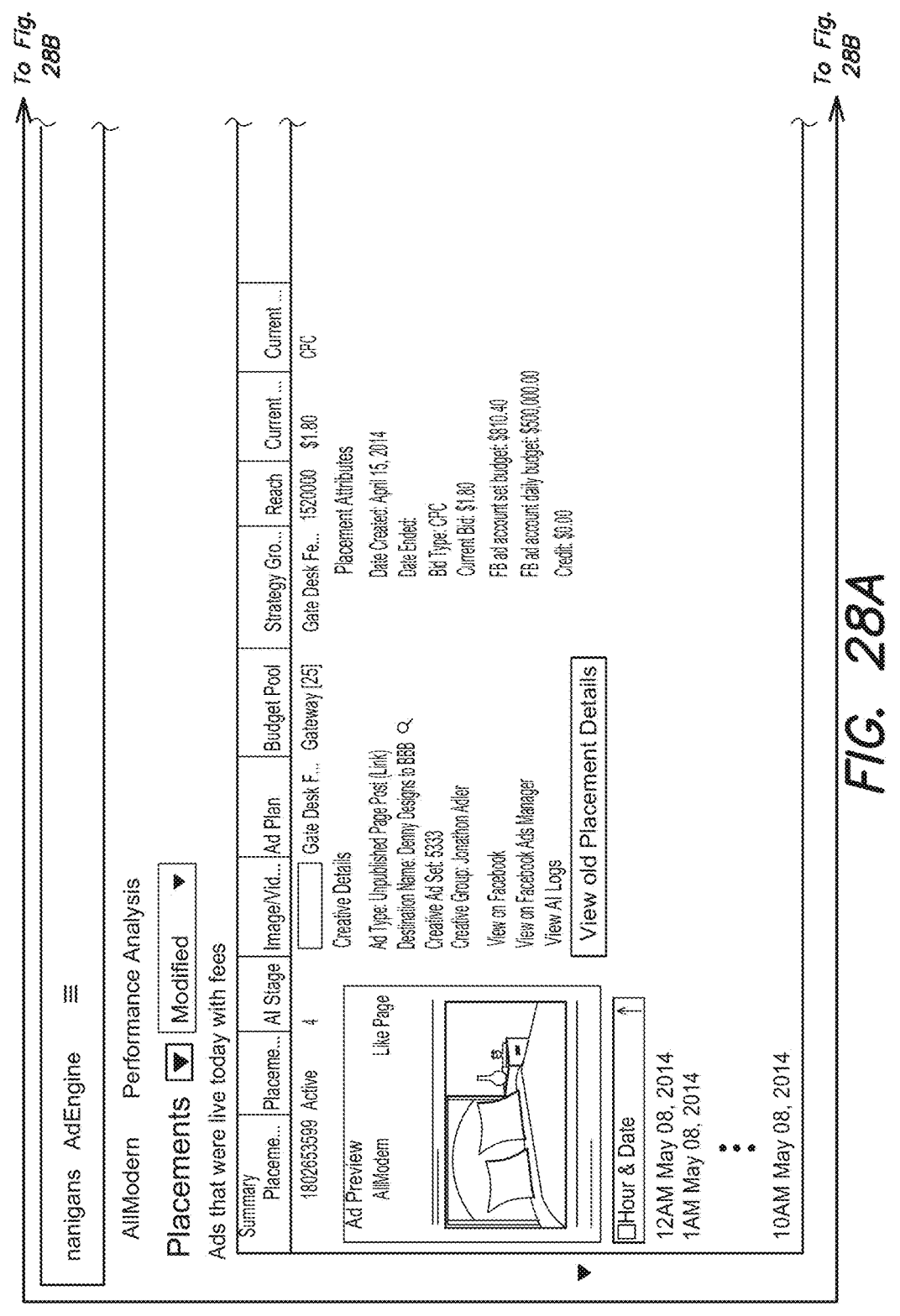

FIGS. 28A-B are an example view of a user interface, according to one embodiment;

FIG. 30 is an example view of a user interface, according to some embodiments;

FIGS. 31A-B are an example view of a user interface, according to one embodiment;

DETAILED DESCRIPTION

Figure 1:
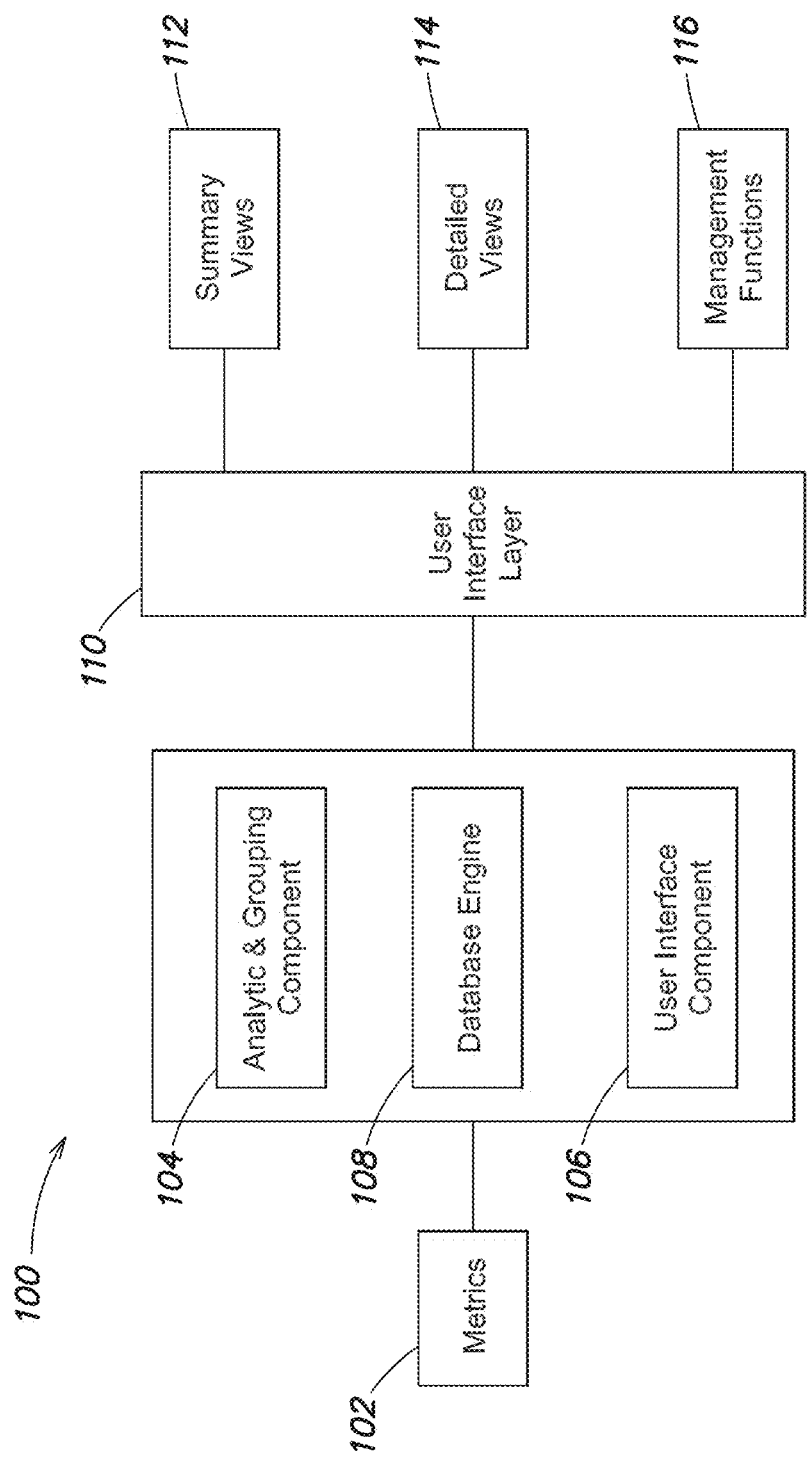
FIG. 1 is block diagram of an example system, according to one embodiment.

According to some embodiments, system components, user interface elements, and user interface displays are provided to facilitate interaction with and to expedite display of any data associated with system managed media objects. In one embodiment, a user interface capable of effectively manipulating high volumes of data is implemented. The system and/or user interface is specially configured to aggregate large data volumes and translate the large data volumes into summary information and incorporate navigable categorizations within the data that enables dynamic selection and visualization of portions of the large data volumes. Such interfaces may be particularly useful for managing large amounts of information, such as ad placement and performance information that is generated within an advertising network associated with ad campaigns. Further, organizations of the underlying data enables improved visualizations, reduced retrieval time, reduce delays, and reduce the computational efforts required by the system to display the large data volumes. In one example, visualization of data based on cached data structures enables consistent views of dynamically changing data. In other examples, cache invalidation protocols limits the need to re-load data while triggering updates where existing data sets diverge past a threshold amount. These implementation improve over some known systems which fail to provides consistent data views, and that do not address data divergence issues in consistent views.

According to one embodiment, an interface may be provided that is visualization of a data-centric pivot table that allows dynamic navigation into more specific information, such as ad placement information. The visualization can be limited to portions of the high data volumes, with subsequent portions being identified by the system and retrieved only as a user scrolls through a first set of information. For instance, a user may be presented an interface that allows a user to navigate through performance analysis data (e.g., ad placement performance information) to locate specific ads and their performance within a hierarchical view. According to one embodiment, pivot table visualizations enable superior customization of data over some known approaches, and enable reduction in data visualization (e.g., with focus views and storing of view configurations, among other options) and the associated computations that would be required to visualize the same information in other conventional systems.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 shows an example of a system 100 for generating and displaying a graphical user interface for high volume data analytics. The system receives advertising metrics 102 from any number of advertising platforms or publishers of advertisements. A data analytic and grouping component 104 is configured to process the received metrics and store the data according to, for example, advertising type, advertising groupings, advertising targets. In one example, the analytic and grouping component captures information on the advertising type, advertising groupings, advertising targets from a database engine 108, determines the appropriate associations, and the database engine stores the associated data and any summarizations or calculations on those values in a database. In one embodiment, the user interface component 106 is configured to provide a visual representation of pivot tables executed against the database. Each view of the database can be likened to a new pivot table, where each view performs specific selections on the database data and presents analysis on the current selections.

According to one embodiment, the system presents a unified user interface layer 110 that is presented to users of the system. The user interface layer 110 is configured to organize and display the variety of summary views 112 (e.g., views 400, 600, 1400 of FIGS. 4A, 6, and 14 respectively); the variety of detailed views 114 (e.g., FIGS. 22-31); and any management functions 116 and/or views.

Figure 2A:
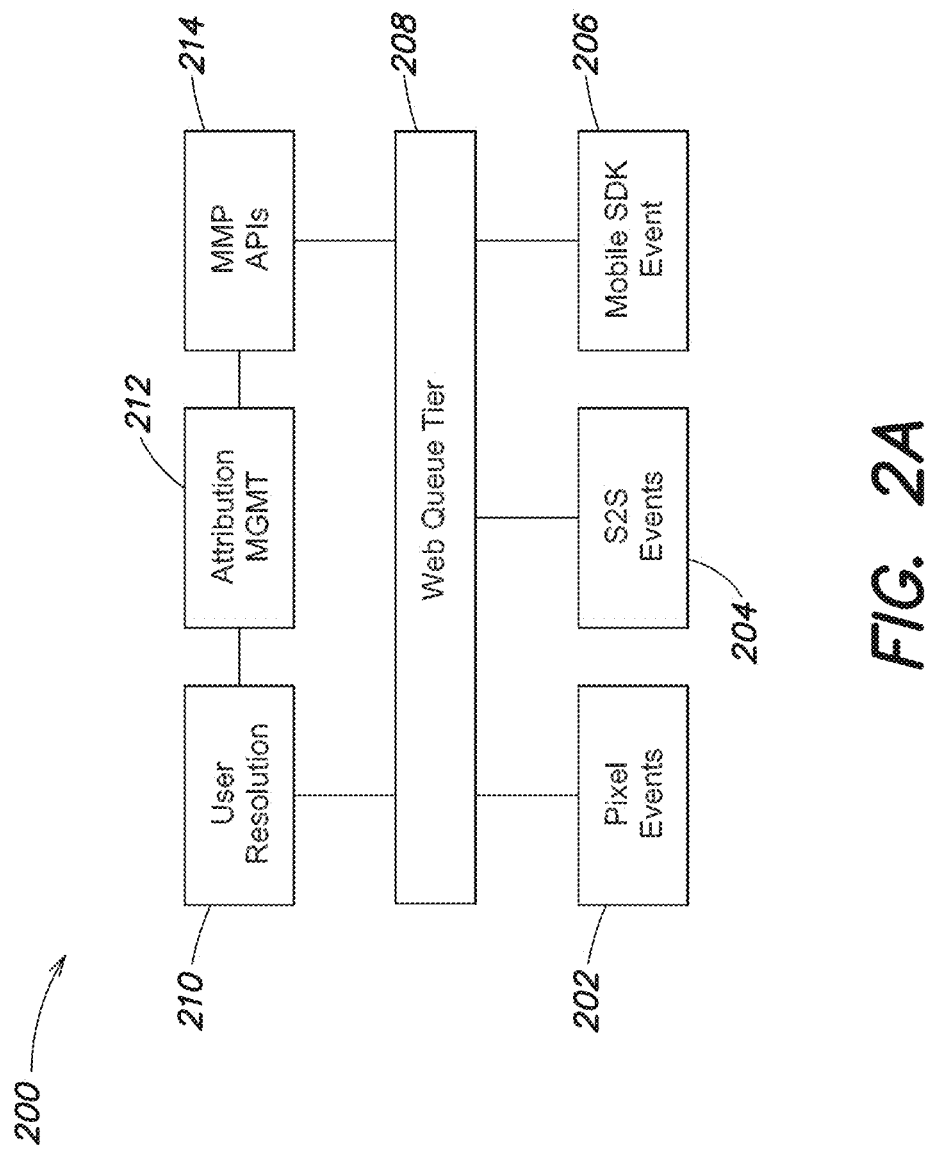
FIG. 2A-C are block diagrams of example systems, according to one embodiment.

Further, various aspects of the invention may be practiced with one or more advertising automation systems shown by way of example in FIG. 2. In particular, system 200 can be configured for processing high volumes of advertising-related events in a distributed advertising network. Such events may be originated by one or more sources and may be of various types (e.g., pixel events 202, S2S (server to server tracking) events 204, mobile events 206, etc.) that are received and handled by a web queue tier 208. The system may also include various components, such as a component that performs user resolution functions (determining users across multiple platforms e.g., 210), a component that determines attributions 212 (e.g., by observing impression/click histories and tracking conversions/actions), among other functions. The system may have other components, such as components that perform CRM functions, receive product/inventory information, real time structured data (e.g., real time bid (RTB) data (e.g., bids, wins, clicks)), and receives offline conversion events or other information that may be used to analyze performance of particular ads. For instance, there may be components that perform offline analysis of performance data to determine higher level functions, such as optimized bidding and budgeting of ads. In some embodiments, multi-media partners (MMP) and respective application programming interfaces (e.g., MMP APIs 214) can be integrated into the system to facilitate attribution management, data capture, events information, etc.

According to one embodiment, FIG. 2 illustrates an embodiment of a data measurement and attribution layer integrated into the system. The bottom blocks (e.g., 202, 204, 206) illustrate examples of the sources of user interaction data. For example, javascript pixels are used to communicate website interaction events for individual users to the system. In another example, a mobile software development kit ("SDK") is similarly used to communicate mobile app interactions. In another example, there is also an interface to capture server to server based events, where a server belonging to an advertiser or content provider entity can directly provide respective data to the system.

As illustrated, each of the example sources communicate with a set of servers, for example in the second layer of the figure (e.g., the "web queue tier" at 208). The web queue tier 208 includes globally distributed web servers which provide load distribution, queuing, and cookie management, so that the end user's browser or mobile app is not slowed down waiting for the completion of the attribution process (e.g., data tracking and identification of associated users and/or actions).

In one example the web queue tier is a set of servers implementing user resolution and attribution operations. User Resolution at 210 includes a plurality of servers configured to utilize tokens collected by the data sources to synthesize an internal identifier which is unique to each user. According to one embodiment, the synthesizing of the internal identifier does not connect to identifiable information about that user, but rather provides a way to connect events over time to determine which interaction events should be aggregated together for performance reporting. In Attribution Management 212, a group of servers are configured to evaluate each tracked interaction in light of a respective user's history in order to determine which advertisements or content, if any, should receive credit for causing the interaction. According to one embodiment, the system currently implements a "last touch" attribution model, but others are possible (e.g., first touch attribution model, weighted attribution models, hybrid attribution models, among other options). For mobile app interactions, various embodiment of the system are configured to automatically query other servers via mobile measurement partnership ("MMP") APIs to determine the best attribution. Based on the data returned form MMP APIs, the system identifies a best attribution and stores the attribution information.

According to some embodiments, the user interface layer 110 is configured to generate and present tailored views to end users, where the views include navigable visualizations of advertising data. For example, the user interface layer can generate a user interface that is a data-centric pivot table that allows dynamic navigation into more specific information, such as ad placement information through navigable data representations, wherein each data representation can be selected in the user interface to dynamically alter the data displayed or navigate into further detailed selections.

For example, a user may be presented an interface that allows a user to navigate through performance analysis data (e.g., ad placement performance information) to locate specific ads and their performance within a hierarchical view. The specific ad information that is displayed may include performance information specific to the filters used to navigate to the specific ad. Such an interface is beneficial, as it permits an advertising manager to quickly locate relevant ad placement details through a data-driven interface. In one embodiment, the interface may include the ability to present an inline summary of the ad placement within a tabular view of the performance data. Summary information associated with the displayed ads may be changed depending on the filters or other user selections within the interface. Such capabilities may permit a user (an advertising manager or other user type that manages ad placements) to quickly locate relevant ads within the user interface that relate to the displayed placement performance data.

Figure 2B:
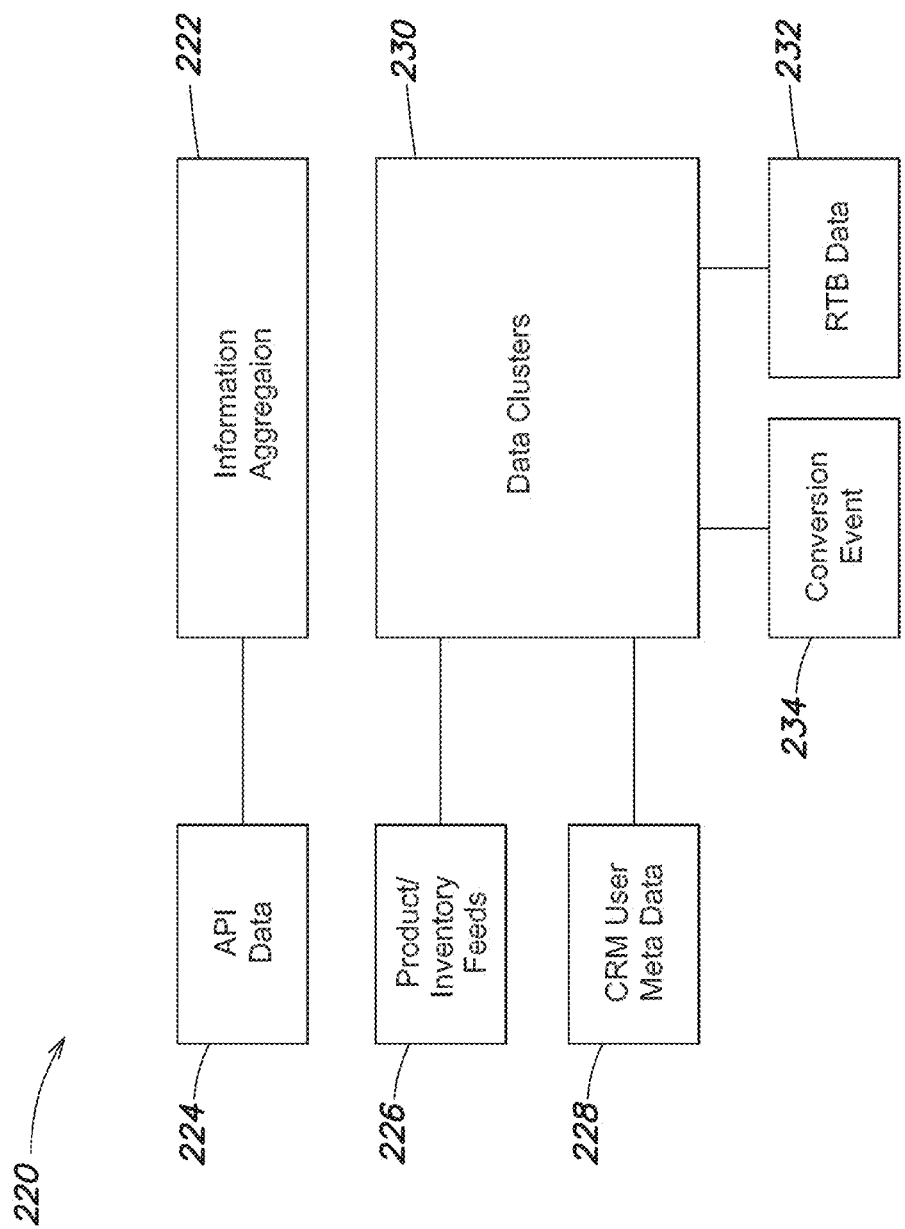

FIG. 2B illustrates data management systems and functions executed by the system. According to one embodiment, the system 200 is configured to receive, analyze and return processed analytics to online advertisers, by aggregating respective data from the measurement and attribution layer (e.g., illustrated in FIG. 2A). In one embodiment, the system implements a set specialize servers (e.g., 222) configured to provide information about interactions aggregated by advertisement, attribution time, and interaction time—these aggregations can be referred to as of time cohort rollups which can include aggregation of related information or information that can be grouped based on similarity.

In further embodiments, the system can be configured to combine this information with data drawn from advertising publisher APIs (e.g., 224) and RTB data streams (e.g., 232), as well as various advertiser data sources (e.g., conveying conversion events at 234), such as customer relation management ("CRM") systems (e.g., 228) and product and inventory feeds (e.g., 226). FIG. 2B illustrates these data sources connecting to a set of data clusters (e.g., 230). In one embodiment, the data clusters 230 include storage systems that provide a variety of mechanisms of access to the integrated data with different performance characteristics suitable for different applications using the data. In one example, a MySql cluster can be configured to support functions and displays of the high volume analytics systems. In another example, the other systems (e.g., Hadoop, Aerospike, etc.) support real-time bidding and performance modeling and optimization.

Various embodiments of the system enable one or more of or any combination of: processing and rendering of analytics on 600 million conversion events each day; globally (DNS) balanced web tier; manage cookies; handle redirects and containers; accept and queue events; user resolution; horizontally scalable processing; multiple tokens and/or levels of authority for accessing and/or visualizing data; device bridging by first party ID; MMP API integrations; bridge click-to-install gap; attribution management—for example, based on user impression/click/event history; in another example attribute is defined by last click but other models possible. Further embodiments enable one or more of or any combination of: processing 600 million conversions/day; 100 thousand RTB events/second; 400 million user records; 100 million feed elements; 10 million MMP API data rows/day; mixed granularity (e.g., by event, user, product, ad time); storing real-time structured data, for user management, attribution, RTB match; execute map/reduce and/or ETL frameworks; which can be used for modeling and exploration; and can include low latency rollups (e.g., information aggregations) which provide merged cohort data with time information, which the system can use for reporting and/or API decisions.

Yet other embodiments are configured to execute one or more or any combination of the following: unique interface paradigm which provides visualization of live performance context data while executing management functions, editing existing placements, etc.; context-specific actions and visualizations for live campaigns and directly integrate live analytics views; fast, configurable analytics interface responsive to user input; API triggering responsive to user interface input; multi-layer, multi-dimensional aggregation of performance/placement data; comprehensive ad attributes and metrics; powerful sorting and filtering in responsive user interface; variable time frames and granularity associated with data aggregates accessible and tunable in the user interface; graphic and tabular views; near real-time reporting (e.g., with hour granularity, minute granularity, etc.); and tailored performance even for large campaigns and wide time windows. Still other embodiments enable one or more of or any combination of: a custom procedural query engine; queries against generic object hierarchy; building result trees with multi-layer aggregation and, for example, loading of tree segments to optimize fast visualization; attribute and metric filtering at any tree layer; persistent result set management; smart object/data and result set caches to optimize visualizations; pre-loading of frequently used data; object definition and data access plug-ins; client-side data browser and object manager; interfaces to server API for analytics access; smart client-server scrolling (e.g., incremental loading of data); dynamic attribute and metric panels; context/selection-specific action menus and panels; load and pivot ad-level lifetime campaign data visualized in under one second; remains responsive for time-based analysis over GBs of data; and a dynamically load balanced, fault tolerant cluster.

Figure 2C:
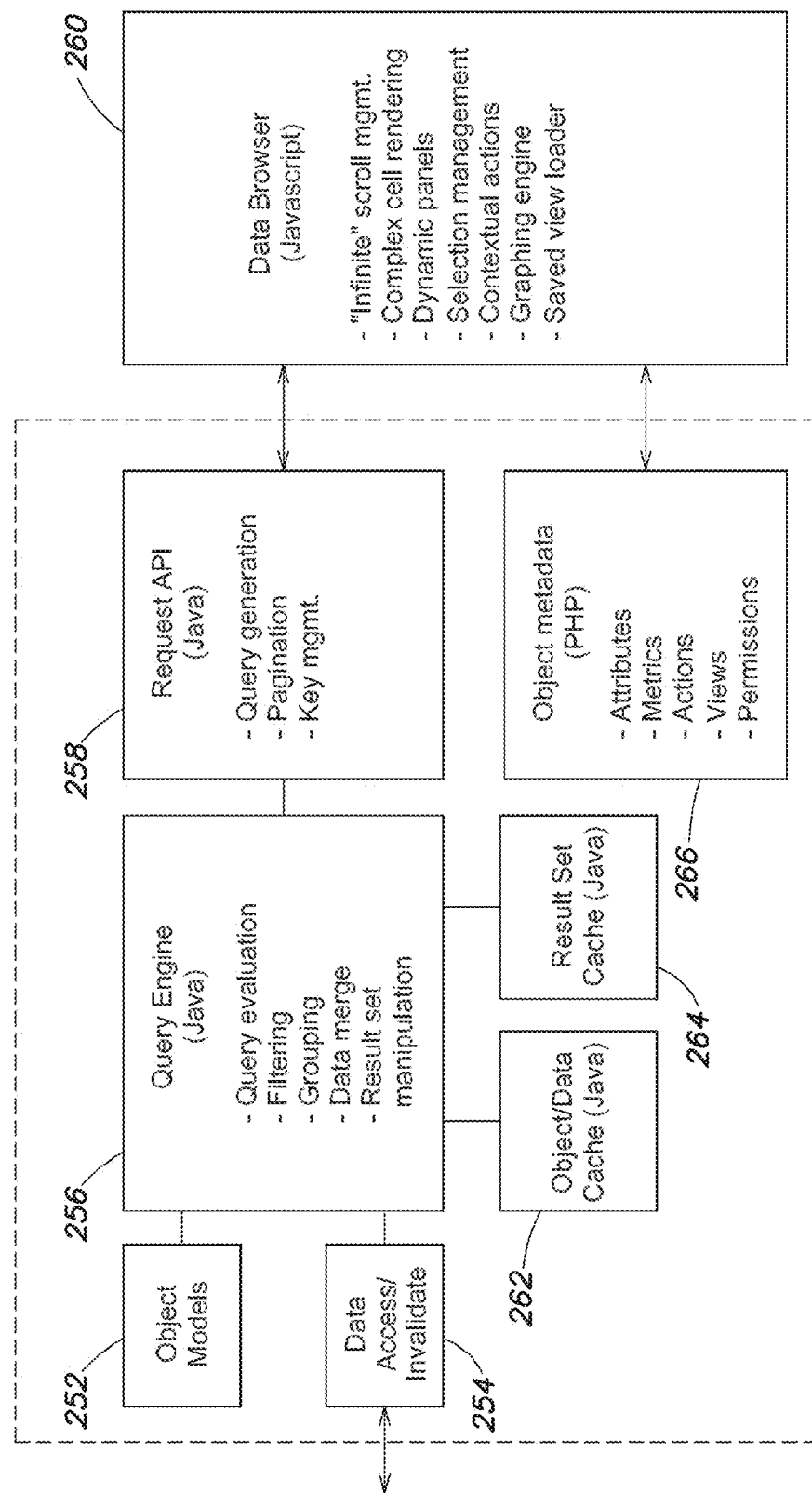

FIG. 2C is an example block diagram showing data analytic components and workflow executions. FIG. 2C shows the same components of the system that enable various features of the system and/or user interface displays. For example, models definitions (e.g., 252) describing the organization of placement metadata (e.g., 266 detailing, for example, how to find the creative elements of an ad from an ad id in a data row) and code to fetch data from the system, as well as provide signals for cache invalidation (e.g., 254) when key data changes. In one example, data is loaded and cached for display in the user interface. The data is cached to facilitate access, while cached, monitoring processes review cached data for changes (e.g., real time data feeds can constantly update data). By invalidating a cached entry or data object the system forces loading of the most up to date information in the user interface, and for example, when the user is accessing administrative functions/UIs, and/or where the real time data in not part of the active display.

In one embodiment, the query engine implements in-memory queries against aggregate advertising data (e.g., loaded from FIG. 2B) stored in an object/data cache (e.g., at 262). The engine can be specialized for flexible dimensional aggregation, such that the underlying (ad, attribution_time, event_time, etc.) data can readily be analyzed based on ad properties and time window aggregates. As the query engine answers queries, it stores results in a result set cache (e.g., 264) so that the results for a specific UI session do not change unexpectedly as data is updated.

The analytics user interfaces cane be implemented through a javascript client side app (e.g., 260) with a corresponding server-side API (e.g., 258) that interfaces with the query engine (e.g., 256). The JS app issues data requests to the API (e.g., 258) as users configure aggregation, filtering, and date range settings, and then manages data fetched via the API from the matching result sets to provide high performance on the client while operating within reasonable client memory limits.

According to one aspect, the user interface is specially configured to manage, aggregate, and dynamically select data for visualization responsive to constantly updating data feeds (e.g., live placement data associated with an advertising network). The dynamic nature of the received data allows a user to selectively control their view of the changing data, for example by creating and saving user interface views. In one implementation, a database management component is configured to receive the dynamic data feeds, translate the dynamic data feeds into standardized formats, and group the dynamic data into selectable and displayable elements.

According to another aspect of the present invention, a visualization interface may be provided that includes a web-enabled pivot table used to analyze and present ad performance data. According to one embodiment, advertisers may use a pivot table to view, sort through, and visualize multiple dimensions of advertising or groups of advertising data. Such tables, according to various embodiments, are configured with the attributes and metrics that are specifically tailored to user's needs by adding predefined audiences, creative elements, data-related attributes or placement details, followed by the metrics that determine campaign success. Once the selections within the interface have been made, the user may be permitted to simply drag and drop displayed elements to re-order metrics and/or to create a customized campaign dashboard. Such interfaces may be modified to include a summary view associated with a specific ad within the table based on specific user selections within the pivot table. This permits, for example, a user to selectively create a dashboard using certain metrics while at the same time seeing the specific ad placements and their associated summaries according to the configured dashboard. For instance, if an advertiser wants to see which creative was performing the best, the user is permitted to sort by key metrics (e.g., ROI, LTV, CTR, CPC, etc.) and locate specific summary view information relating to those placements.

Figure 3:
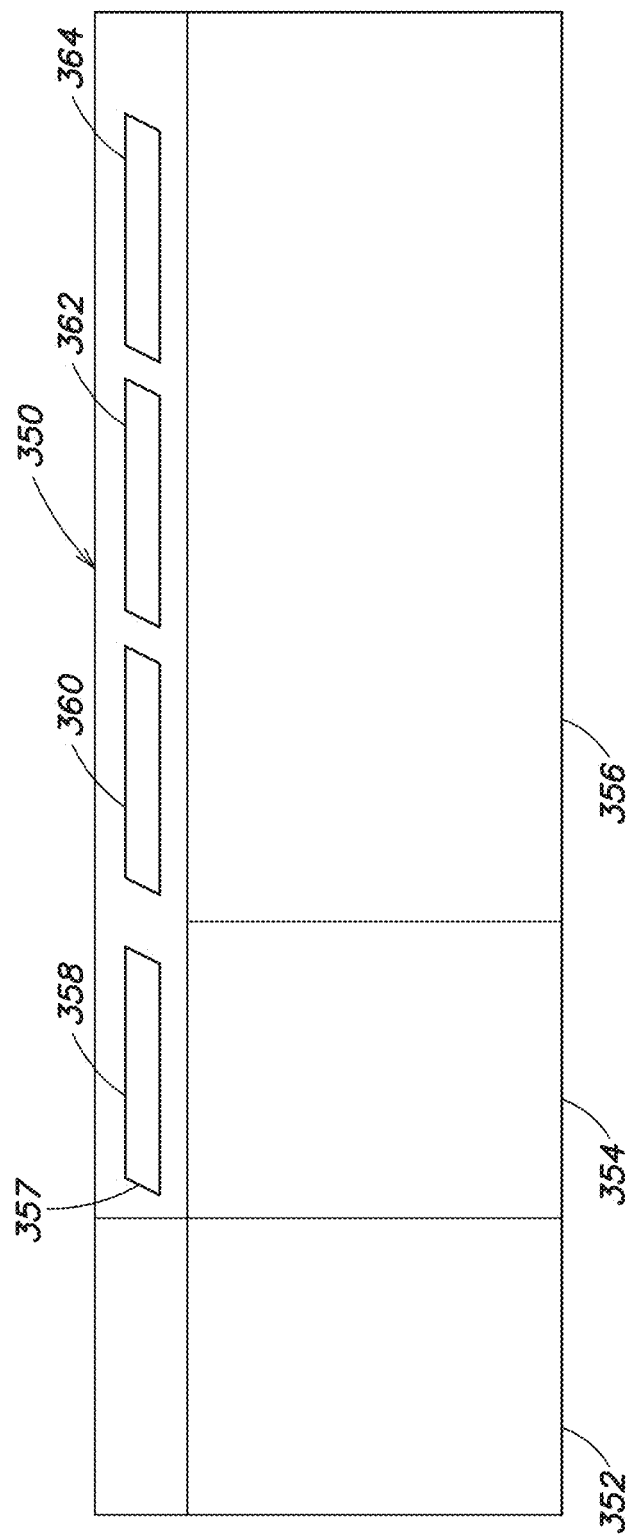
FIG. 3 is an example view of a user interface, according to one embodiment.

An example interface template for a inline summary view is shown in FIG. 3. FIG. 3 illustrates an example format and organization for an inline user interface display that can be triggered to display in a pivot table visualization or in conjunction with a tabular visualization, for example, of performance data. In one example, the inline display can be rendered by the user interface as an embedded row spanning the length of any available columns in a current visualization (discussed in greater detail below).

In one example, the inline user interface display can include an ad preview portion for the inline display 352. Proximately displayed at 354 is a hierarchy display for accessing information on the ad placement being previewed, where the advertisement information is stored according to hierarchical layers. The hierarchy display 354 can be configured to enable navigation between visualizations on the inline display showing respective layers and associated detail. In one example, responsive to selection in the hierarchy at 354 an inline detail portion of the display 356 provides additional information on the ad placement relevant to the selection made in 354. In another example, the default display shown in 356 is shown based on the first level of the hierarchy selected in 354.

The display template can also include further selection menus to facilitate navigation within, for example, the inline display. In one embodiment, display section 354 includes vertically arranged display of hierarchy objects, and each hierarchy object is associated with a display in section 356. In another embodiment, a horizontally displayed inline menu section 357 can enable further navigation through placement information (e.g., via hierarchy object selection at 358), definitional selections associated with a given placement (e.g., via selection at 360), targeting information (e.g., via selection at 362), and may optionally include additional information menus (e.g., at 364) to access information not categorized in the preceding options.

Figure 4A:
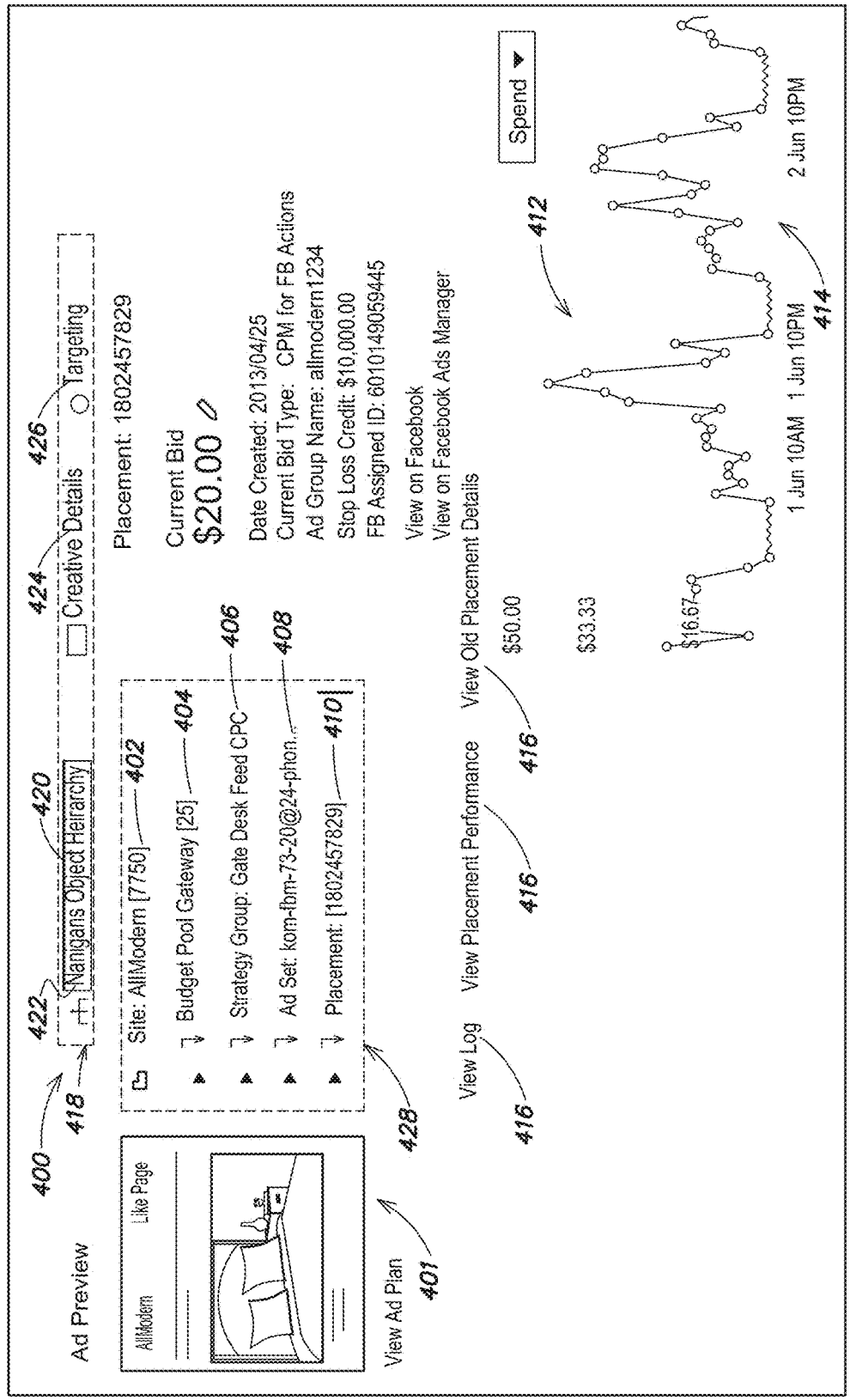
FIG. 4A-B are example views of user interfaces, according to one embodiment.
Figure 4B:
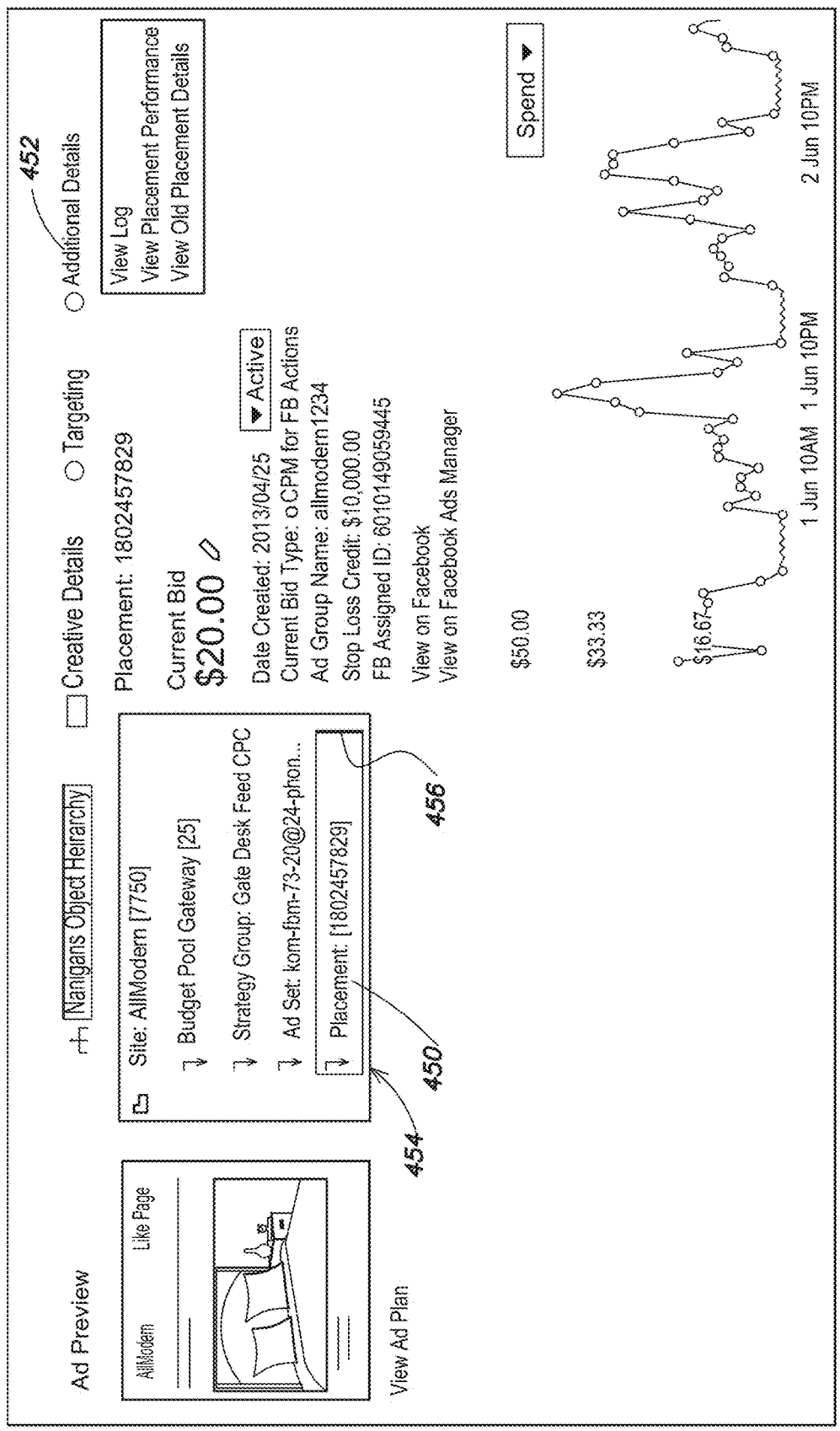

Further examples of the user interfaces are shown and described in FIGS. 4A and 4B, which can be arranged based on the master template 350. Shown in FIG. 4A, is an embodiment of a user interface 400 that may be used to display ad information to a user. The user interface 400 is specially configured according to minimizing the data volume required to convey necessary management information for an advertising network. Some difficulties in managing advertising networks include the high volume of constantly changing data that often needs to be reviewed by a network manager in order to make decisions on how to change, update, terminate, or suspend any number of a high volume of advertising placements. In various embodiments, maintaining contextual information associated with a placement shown in user interface 400 enables visualization of data faster. As data is updated in real time, the contextual display likewise render the data faster that implementations that use separate windows or display for managing additional views. In further embodiments, inline displays paired with additional contextual information on the same placements reduces the need to render as many visualizations, and further eliminates the need to return to prior screens to capture the details information that is maintained through navigation in the inline display.

Summary view 400 includes an example of a view tailored for understanding and summarizing metrics associated with individual advertisements. In one embodiment, view 400 is configured to be introduced into a data-centric pivot table that allows dynamic navigation into more specific information. In one example, view 400 is generates a row in the data-centric pivot table and sized to span the width of available columns in the data-centric pivot table. At 401, a preview of a specific ad is shown to provide a visual indicator and/or reference for a specific advertisement. A second portion of the display 400 includes a plurality of drawers (e.g., 402-410). According to one embodiment, each of the plurality of drawers is a navigable data and visual structure, that is executable via selection in the user interface.

The plurality of drawers are arranged in the visual display 400 based on a hierarchy of groupings. In the example, the hierarchy includes a site grouping—value "AllModern"; Budget Pool grouping with value—"Gateway"; strategy group grouping with value "Gate Desk Feed CPC" (Cost Per Click); ad set grouping with an unique identifier for the ad set; and placement grouping with an unique identifier for the placement. Each drawer having more than one member in its associated grouping is configured to display membership information, for example, the number of members of the grouping. In one embodiment, the summary view 400 includes a longitudinal menu 418 for selecting a display format of the summary 400. In one example, the display format includes a first default view showing an object hierarchy. The currently selected display format can be highlighted in the longitudinal menu 418, for example, at 420. Object 422 is also configured to transition the user interface to summary 400 via selection on 422.

In further embodiments, each drawer (e.g., 402-410) includes an active state and a passive state. In a passive state grouping information, specific value, and membership number information can be displayed. Once selected, for example, by hovering with a user interface pointer or clicking with a user interface pointer—each drawer triggers display of an associated visualization, for example, the active state of the placement drawer triggers a display at 412.

In some embodiments, the drawer is associated with a plurality of information views. Each view operates as a dynamic selection of data from the database that presents summary and/or aggregate information or in some alternative views and management information that can be used to add, modify, delete, and/or update advertising placements.

At 412 is shown some additional detailed information relating to the placement being visualized. In some examples, an initial view can include placement number, current bid, date created, a current bid type, ad group name, stop loss credit (for reactivating ads that would otherwise fail stop loss criteria), and an associated Facebook or other advertising source identifier. In some embodiments, selections made within summary view 400 are reflected in real time on the data-centric pivot table, that summary view 400 is integrated into. According to one aspect, the immediate connection between changes made in the summary view and the data-centric pivot table ensure accuracy in entered information (e.g., facilitates user understanding of context for each selection) and reduce errors in data entry as users reviews and/or manipulates thousands of advertisements.

The views associated with a respective drawer in the active state can also include a graphical representation of the principal information for that view. In the initial view 412, the principle information being conveyed to the user is bid amount for the advertising placement. At 414, the initial view displays recent bids, bid time, and bid amount in a graphical form, so that the user is immediately provided a reference and recent historical window to understand how the current bid amount relates to the placement. Each active drawer view (e.g., initial view 412) can include links to underlying information being displayed/summarized in the view (e.g., at 416 a user can navigate to the underlying information being conveyed by the view).

According to some embodiments, each active drawer can be associated with a plurality of views and can include additional summarizations of additional views. For example, FIG. 4B, includes a second view associated with the budget pool drawer 404. According to one embodiment, the layout of the views associated with each respective drawer is specially configured to appear consistent between drawers, share a basic organization, and convey summary information in a comparable format. The consistent views as a user navigates through a multitude of advertisements and associated data ensure better understanding across larger amounts of data and directly results in reduced errors in management functions and data modification and/or entry in the user interface. In some embodiments, selection of the object hierarchy at 422, triggers the display of a second vertical menu 428 (e.g., comprising a plurality of drawers). According to some embodiments, the first longitudinal menu provides access to additional views (e.g., an object hierarchy view (e.g., FIG. 4A), and a creative details view (e.g., FIG. 6), a targeting view (e.g., FIG. 14). Each additional view can be associated with vertically displayed menus, that enable further refinements of each view, as discussed in greater detail below.

According to one embodiment, FIG. 4B shows an example transition to detailed information on a specific placement via selection of "Placement" 450 in the user interface. To facilitate navigation, selection in the user interface vertical menu 454 is highlighted at 456 with a visual indicator that tracks the current view based on selection on a hierarchy level (e.g. in menu 454). Optional menu options can be visualized, responsive to user selections in the user interface. In one example, "Additional Details" at 452 is visualized responsive to a transition into the "placement" hierarchy via selection at 450. The additional detail option at 452 enables access to additional information (e.g., view log, placement performance, and/or old placement details).

Various embodiments describe the summary views implemented as inline displays. According to some embodiments, the same functions can be implemented as overlay displays. According to one example, the overlay displays are positioned in the user interface to enable visualization of contextual information associated with a placement being reviewed in the overlay display.

Figure 5:
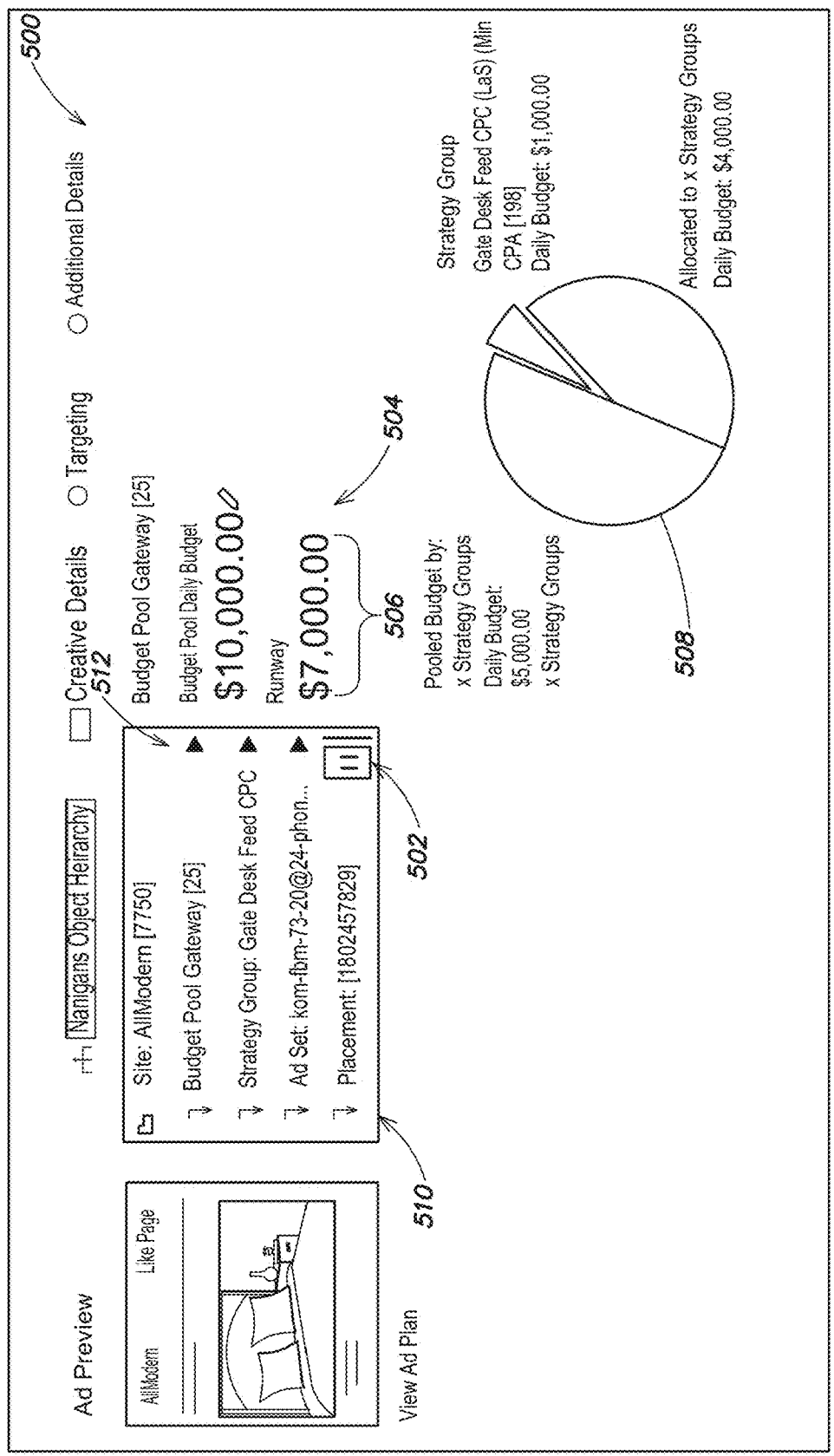

According to another embodiment, shown at 504 in FIG. 5 is a view 500 for conveying budgeting information across the gateway grouping. Included with the summary data at 506 is a graphical representation of the total budgetary information with reference to the portion of the total budgetary information made up by the strategy group at 508. Responsive to accessing detailed information and/or selecting "Placement" in the vertical menu 510, the system is configured to display action control s at 512. The action controls are configured to start and stop advertisement bidding and/or execution in real time. For example, selection of 502 triggers the action control to transition between active and paused states depending on a beginning state of the action control. In the illustrated example, 502 is in a paused state, thus, selection at 502 triggers a transition to an active state. In response to the transition to an active stated the system is configured to communication with a hosting system for the respective placement and activate any bidding instructions for executing the respective advertisement. In one example, the placement can be hosted on the known FACEBOOK platform, and the transition to active state is configured to cause the system to communicate with the FACEBOOK platform via an API executed on the system, that triggers bidding as defined on the system (e.g., in the placement details) and monitors spend and tracks performance of the placement. Transitions to a paused state perform similar operations in reverse (e.g., triggering an API to communicate with a hosting platform to suspend bidding activity). As any changes are made in the summary view, so to does the data-centric pivot table update any corresponding record in real time.

Figure 6:
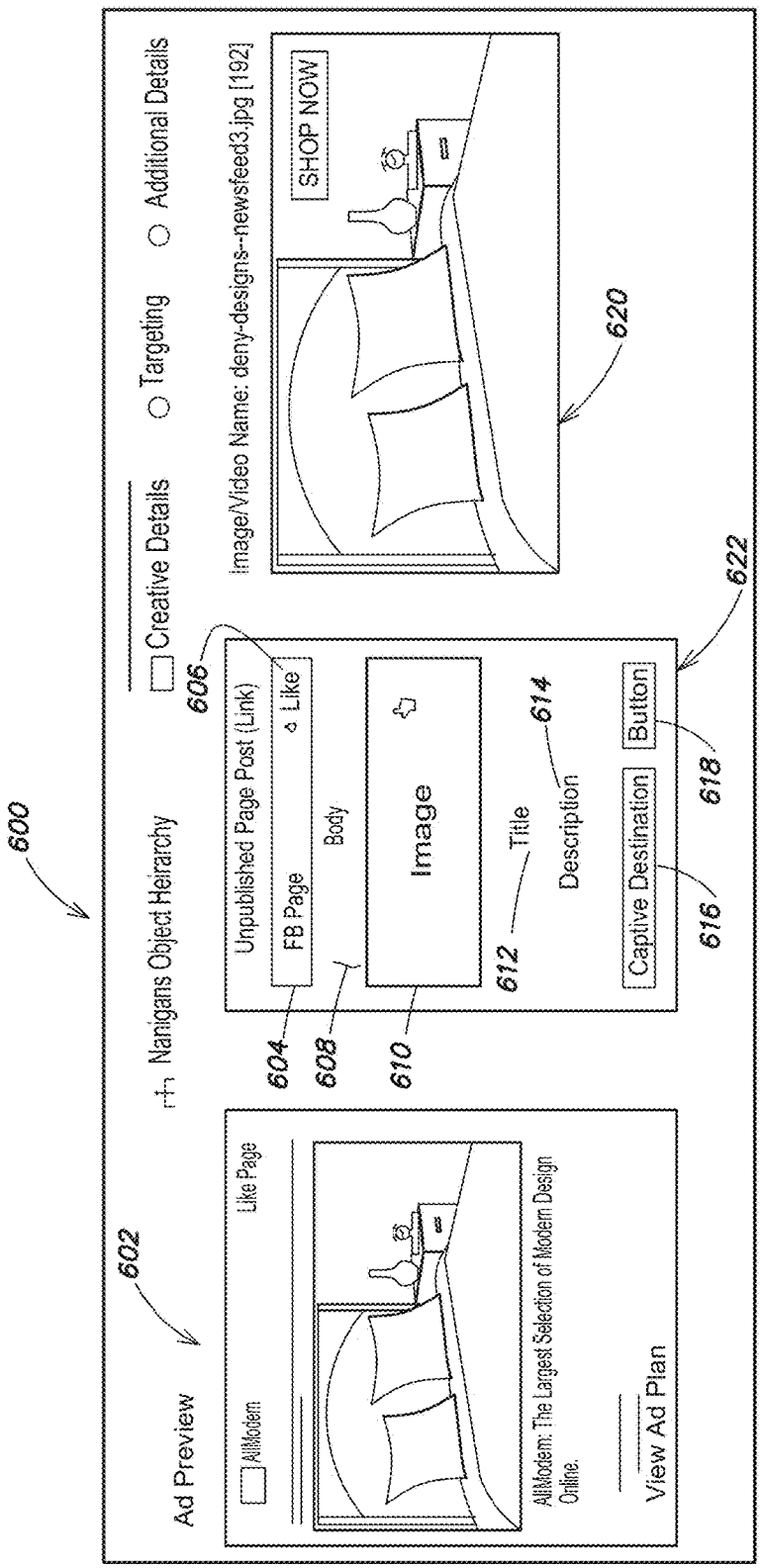
Figure 7:
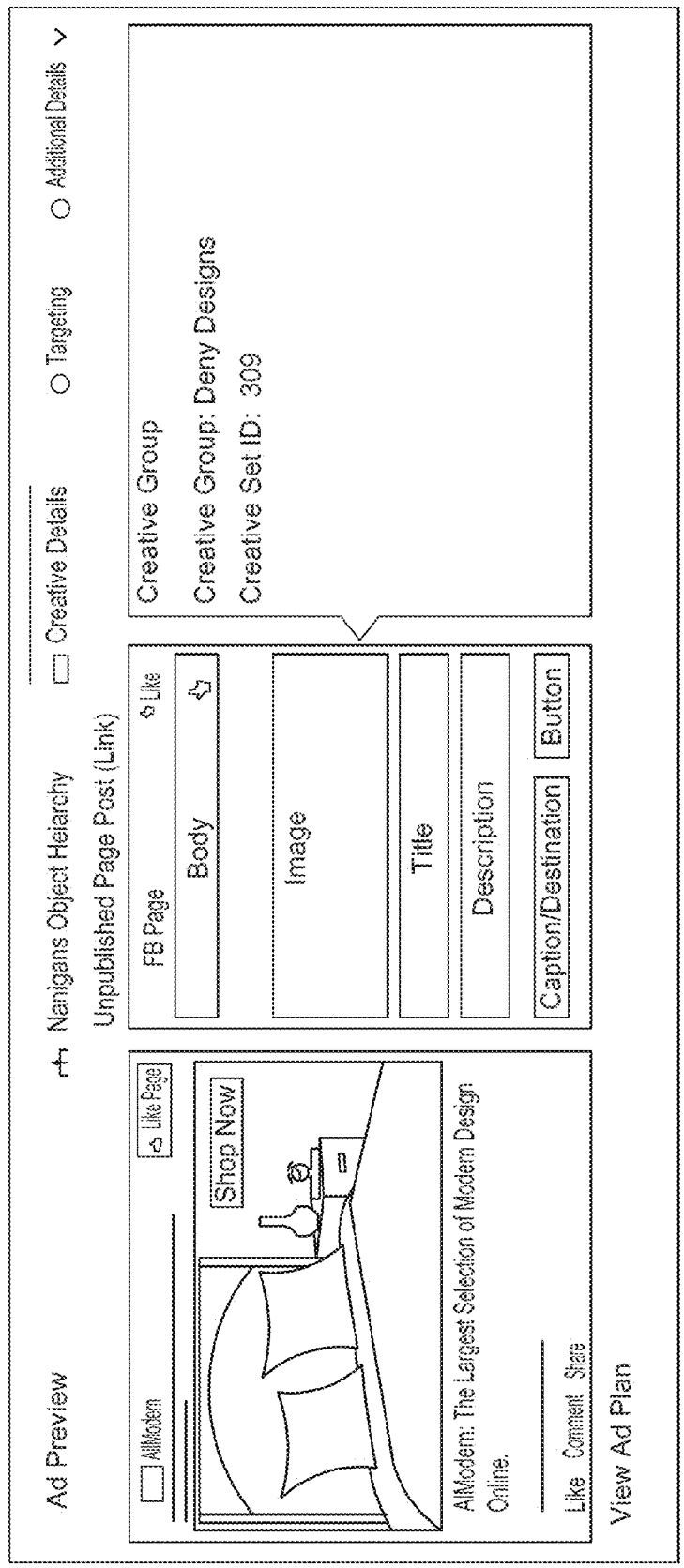
Figure 8:
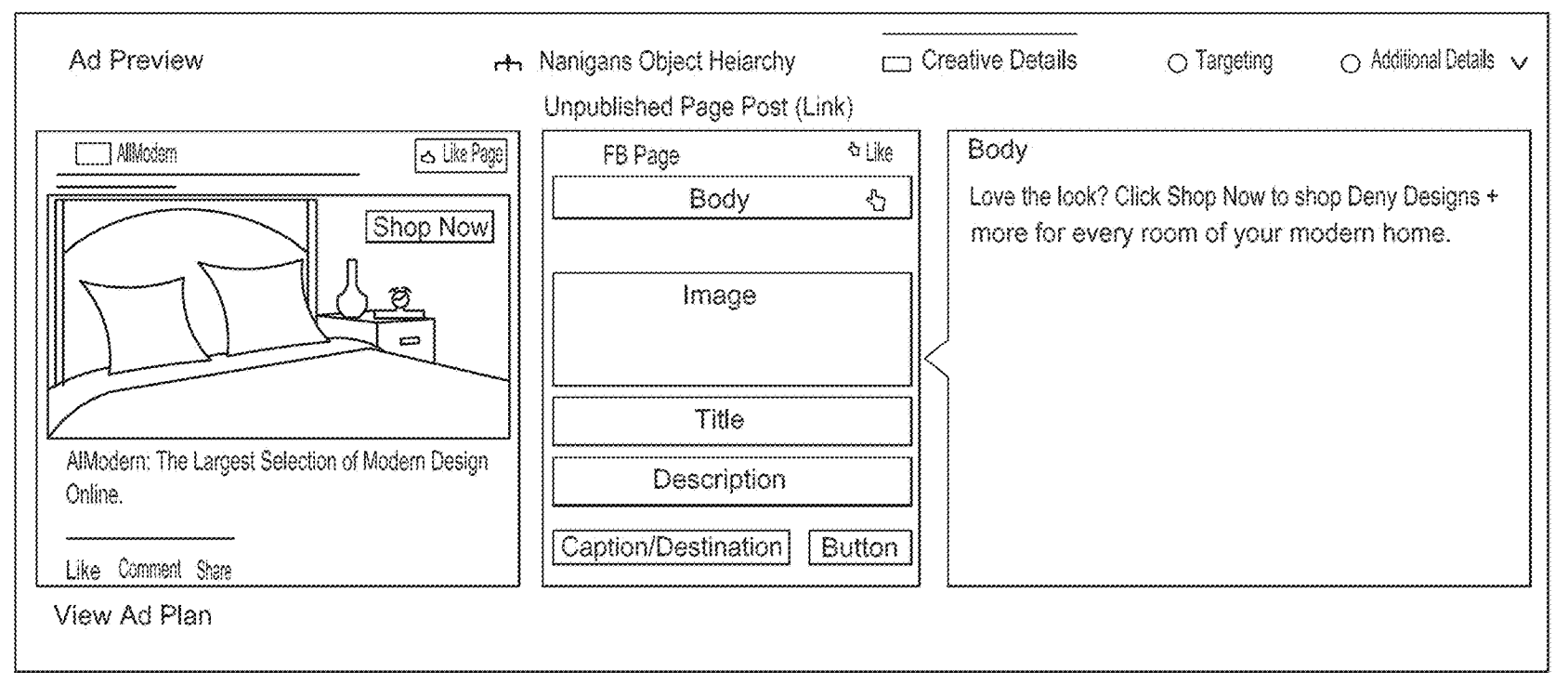
Figure 9:
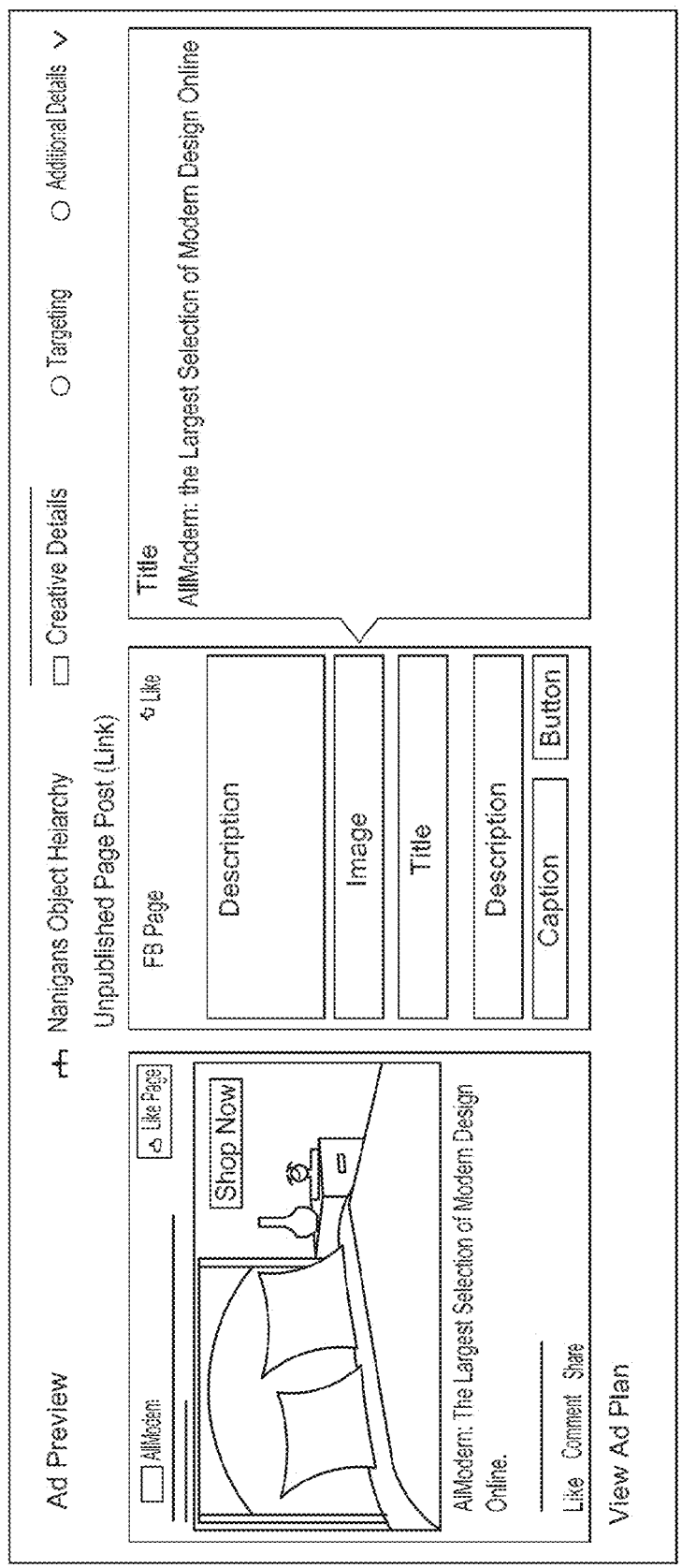
Figure 10:
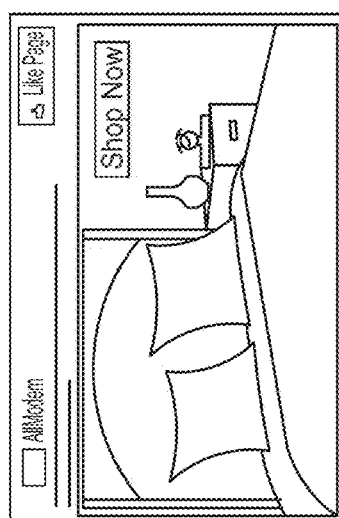
Figure 11:
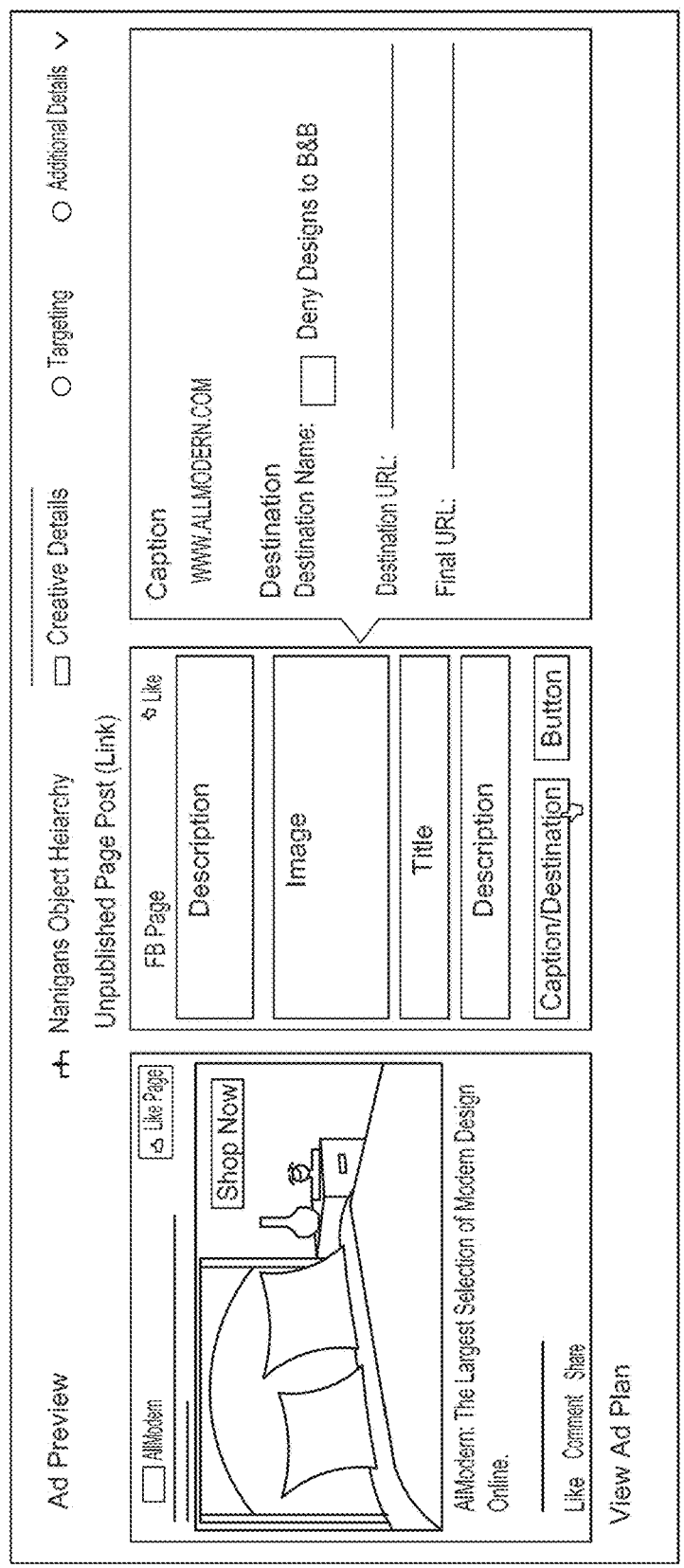
Figure 12:
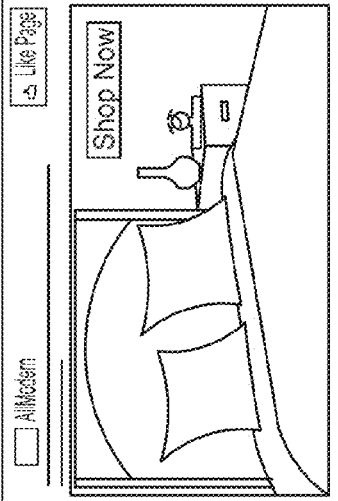
Figure 13:
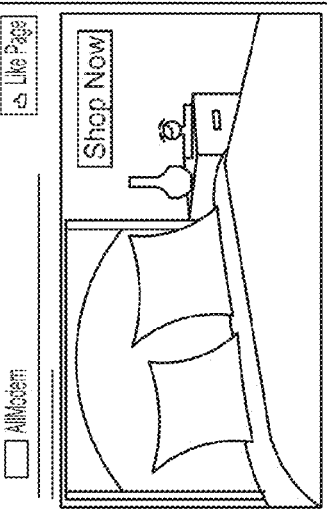

According another aspect, the high data volume analytic user interface is further configured to manage creation and/or modification of advertising placements or ads. The user interface includes selections for navigating to "creative details" associated with an advertisement. Similar to the view 300, view 600 includes a preview of an advertisement 602, and a set of user interface drawers 604-618. Each drawer is selectable in the user interface and configured to present an associated view or associated information in an adjacent portion of the user interface (e.g., at 620). The highlighted portions of the user interface examples shown in pages FIG. 6-FIG. 13 identify the selected drawer via the highlighting and show the associated view with each drawer. As shown in FIG. 6, a creative details view can include a vertically oriented menu at 622, reflecting each selectable portion (e.g., 604-618) of an advertisement or placement that can be modified. In some examples, creative details view 600 can enable creation of a new placement or modification of an existing one. For example, as shown in FIGS. 7-15 selection within vertically oriented menu 622 enables an end user to navigate through portions of an existing (or new) placements, edit any defined portions (or create new portions), and responsive to leaving the creative details views, the system is configured to capture any changes, any new data, new information, and trigger a respective API that, for example, instantiates a new placement on a third party system (e.g., FACEBOOK) according to the user definitions, or in another example, updates an existing placement via execution of a respective API.

According to one embodiment, similar to changes made in view 400, changes in view 600 are reflected in the data-centric pivot table in real time. Additionally, as new data is captured by the system (e.g., via one or more APIs connected to respective hosting systems) entries in the data-centric pivot table update and provide real time contextual information, while a user is navigating summary views and/or summary information shown inline. In further embodiments, the system can delay updating of information to avoid confusion. For example, the system can operate on cached data and/or cached date results, and new data received by the system will not be updated until a cache invalidation event occurs. Cache invalidation can be executed based on detecting a period of time has elapsed, or identifying a threshold number of changes have occurred, among other options.

Figure 14:
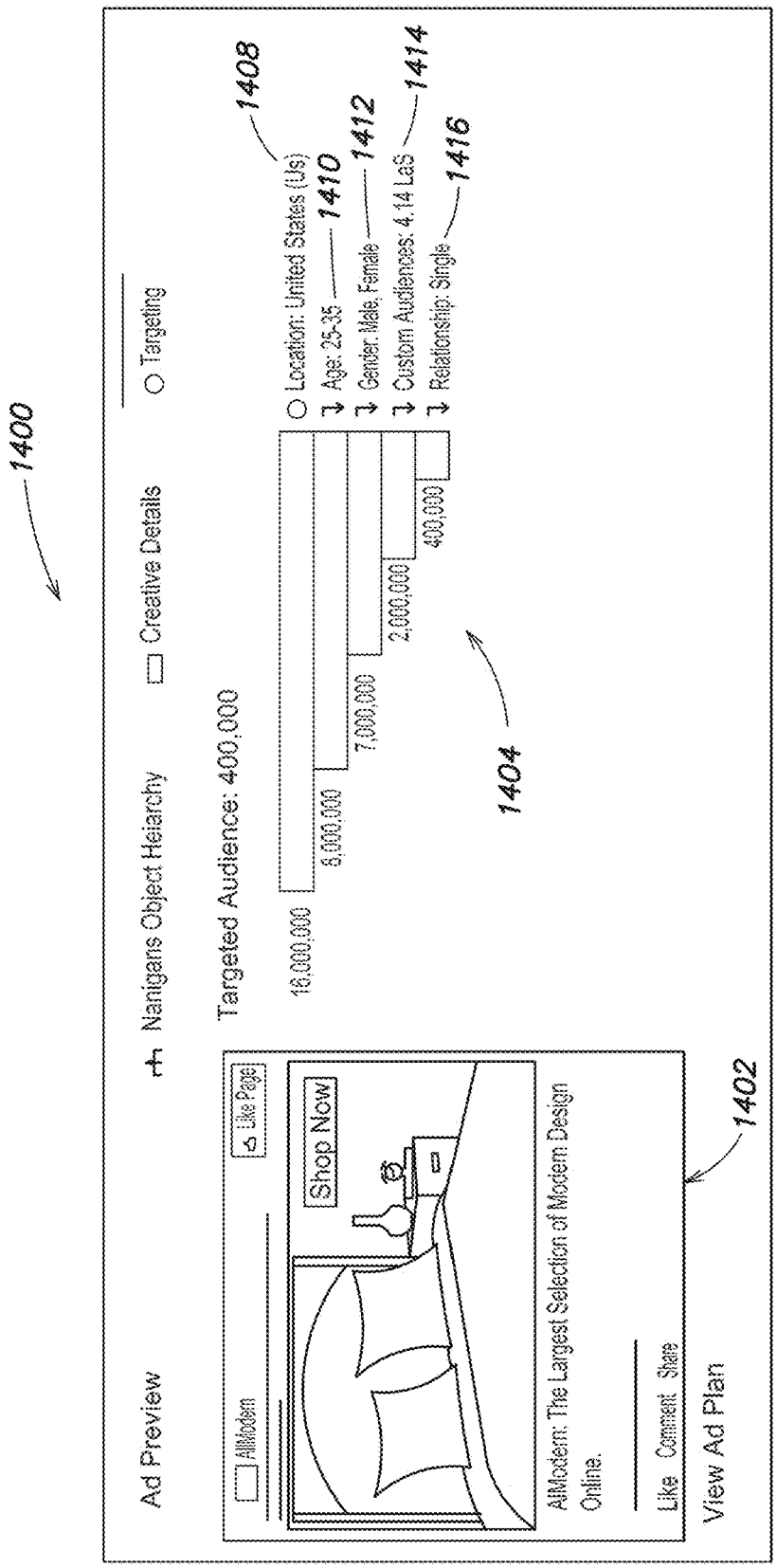
Figure 16:
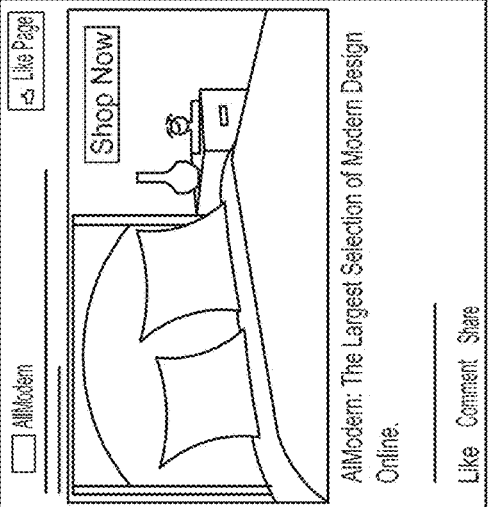

FIGS. 14-21 provide additional examples of user interface views. In particular, FIGS. 14-21 provide example interfaces for summarizing targeting information associated with a particular advertisement, advertisement group, etc. In the example of FIG. 14, user interface 1400 provides a preview view of the advertisement being analyzed (e.g., similar to views 400 and 600). Interface 1400 also provides summary information associated with consumer target of the selected advertisement at 1404. The system and/or user interface arranges target audiences into hierarchical groupings and presents the membership numbers accordingly (e.g., location with value US; age with value 25-35; gender with value male, female; custom audiences with value 4.14 LaS (e.g., a customized grouping of users that may be created, for example, responsive to a listing of attributes to an advertising server (e.g., providing a listing of email addresses and receiving Facebook user names within a defined group)); and relationship with a value of "single"—1408-1416).

Figure 15:
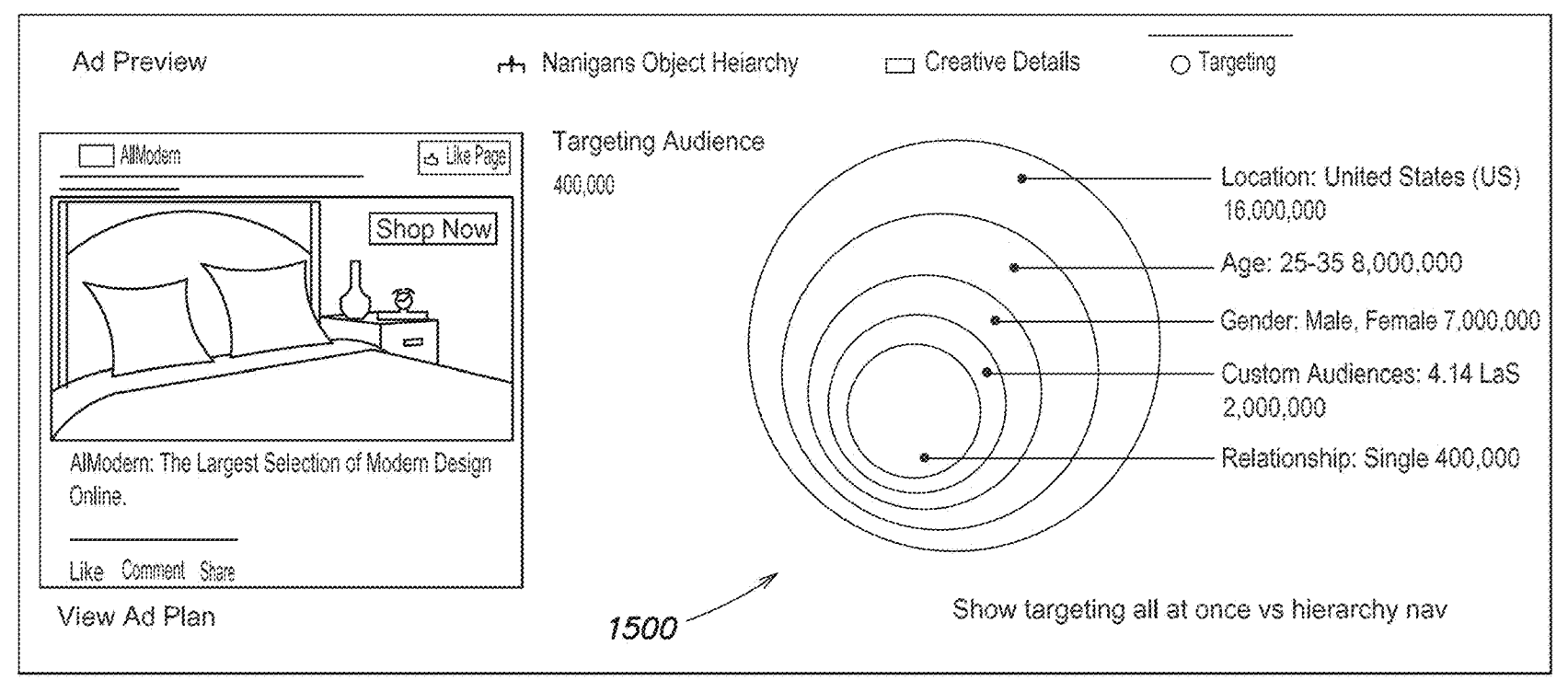
Figure 17:
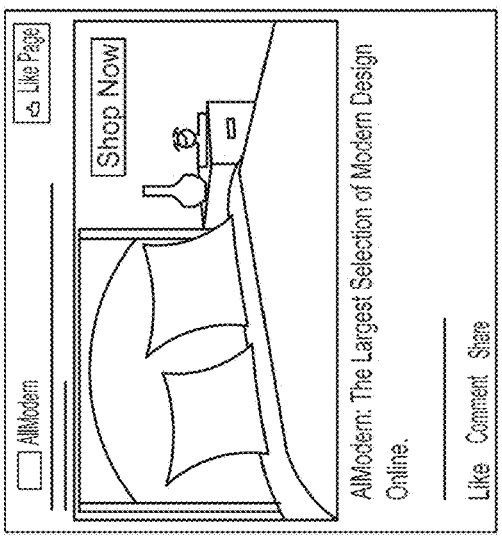
Figure 19:
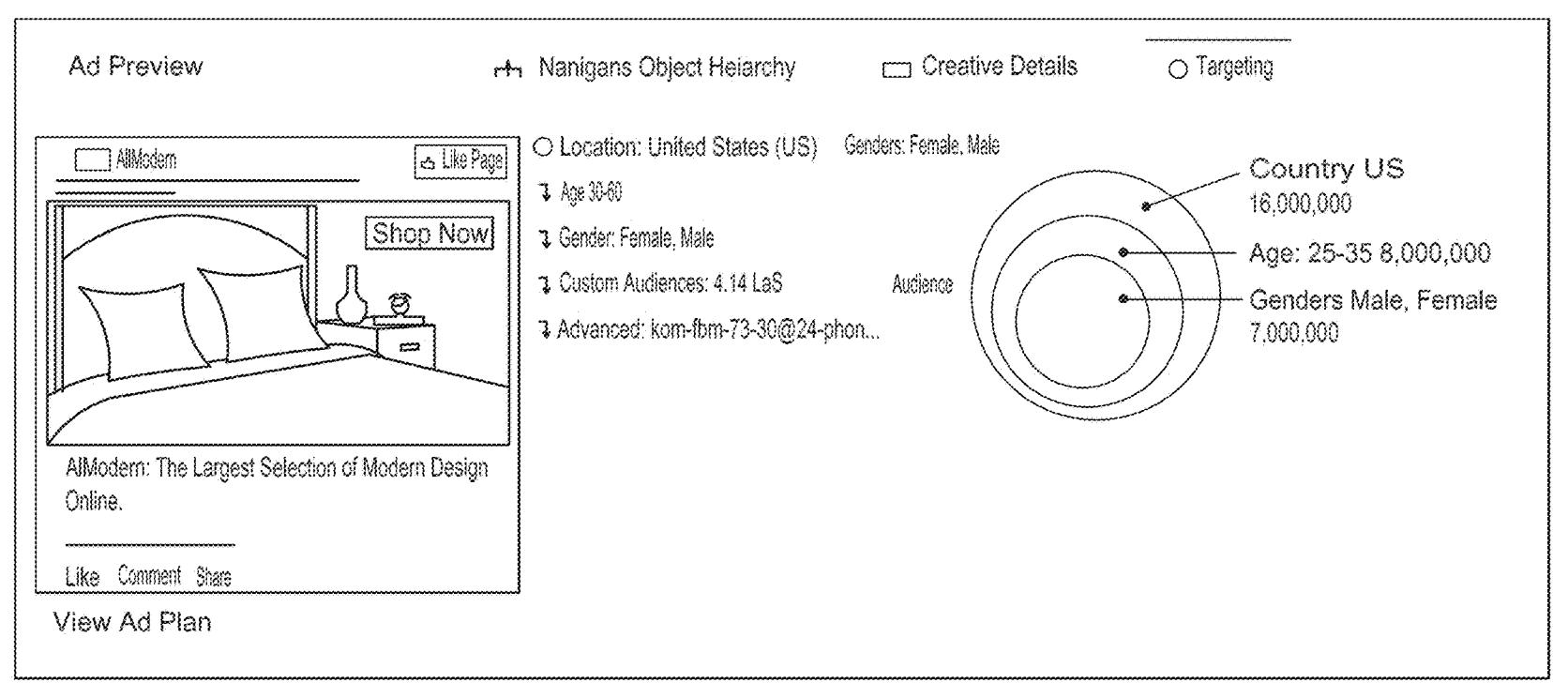
Figure 20:
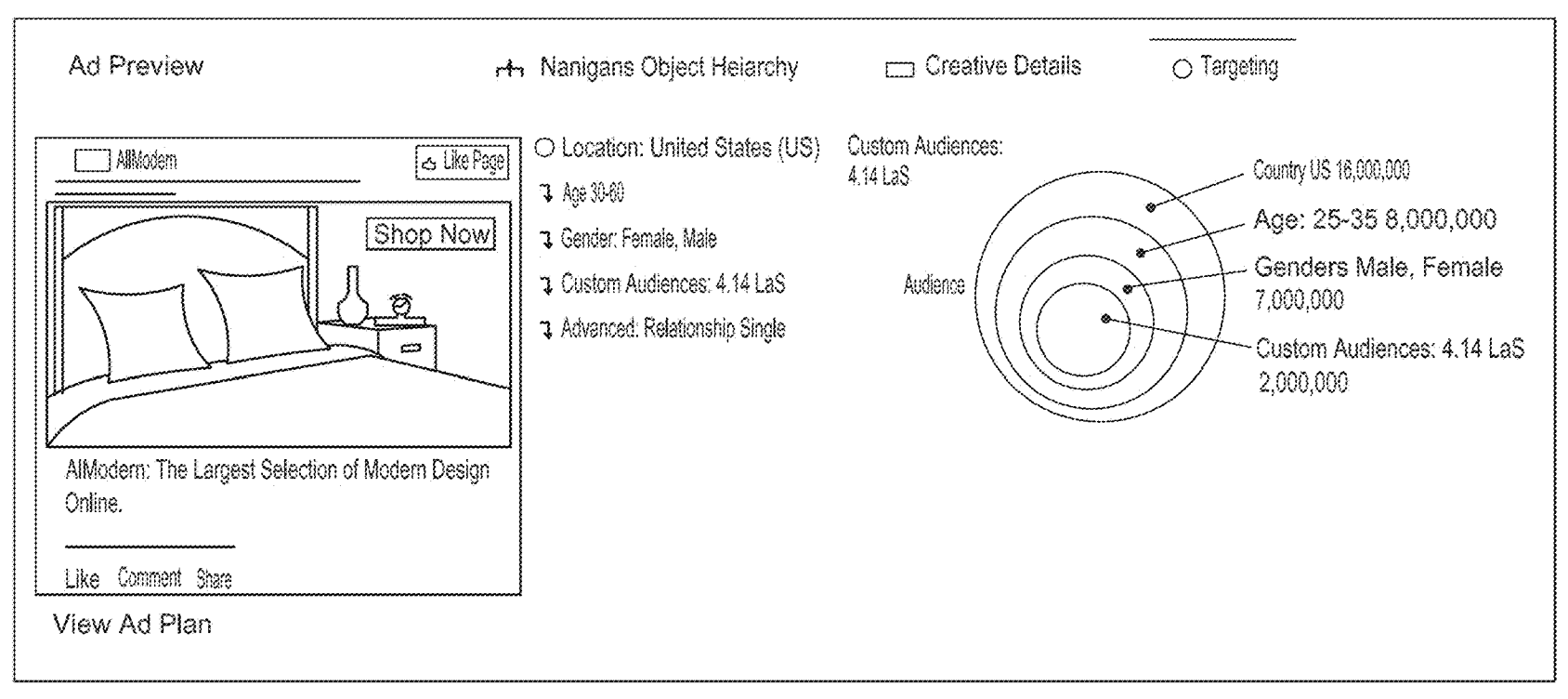
Figure 21:
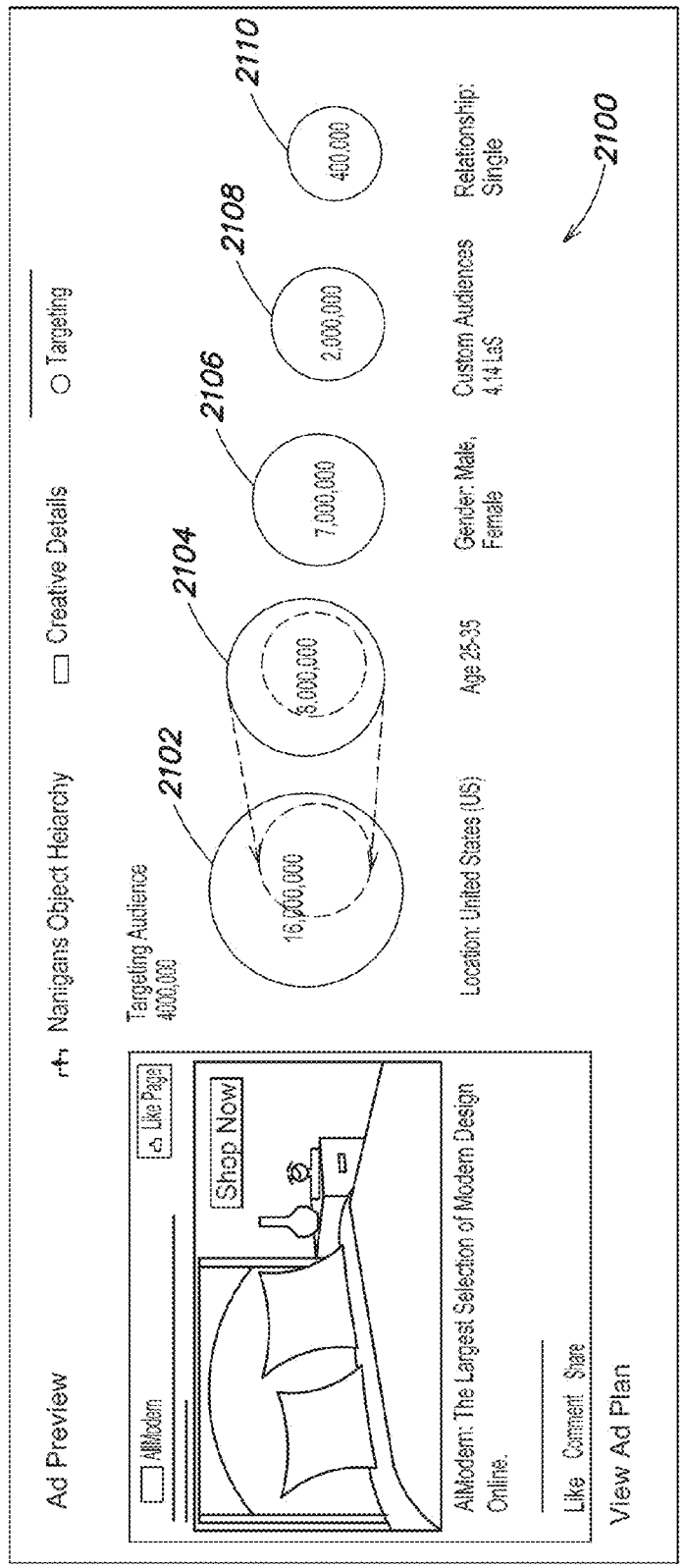
Figure 22A:
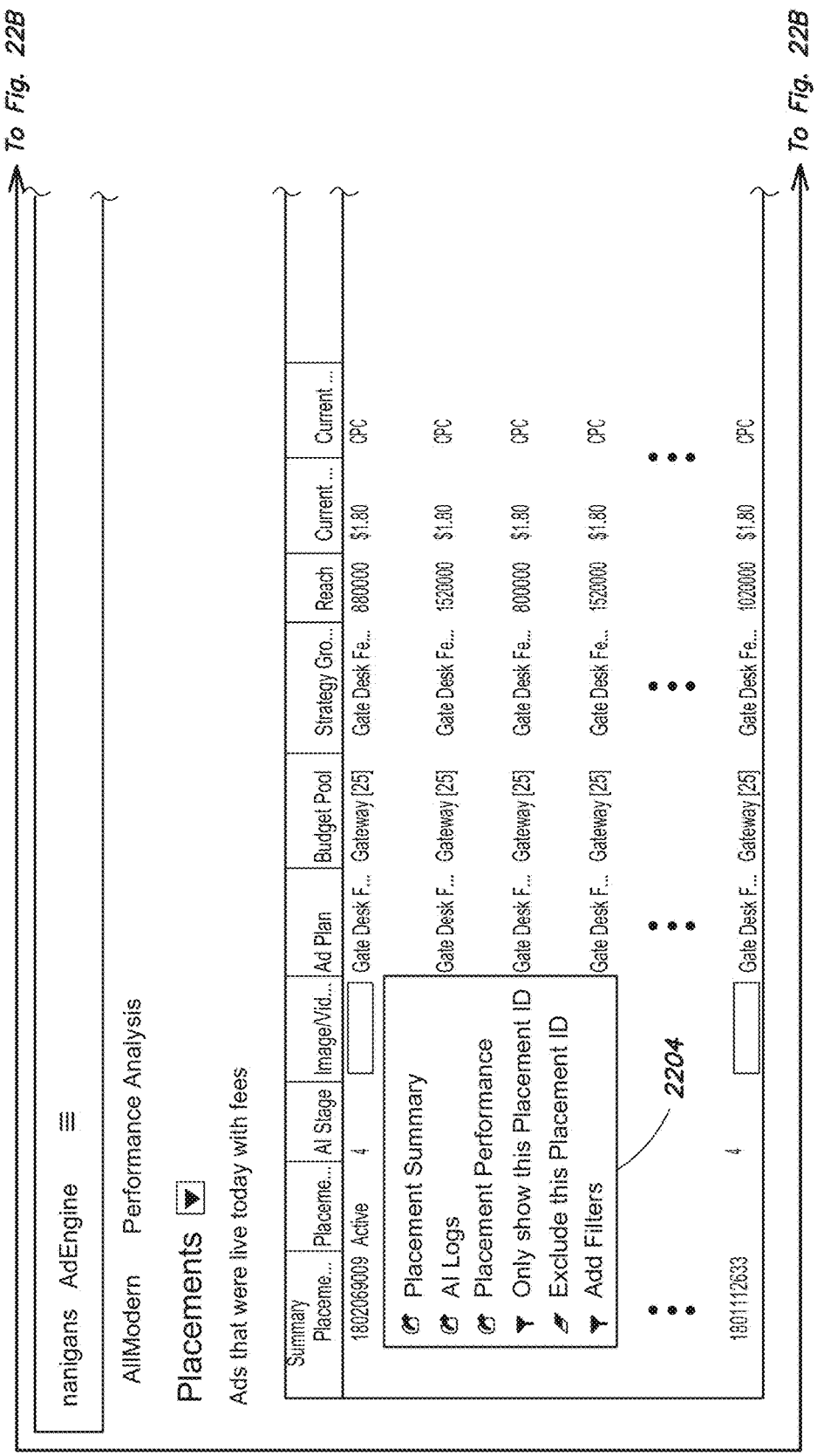
Figure 27A:
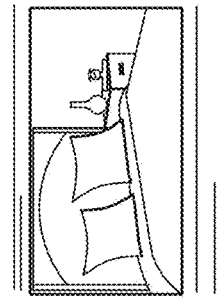

Additional views summarize the targeting information for a viewing user differently (e.g., 1500, FIG. 15). Each categorization is selectable to view information on categories (e.g., view 1600, FIG. 16) and can be navigated via selection in the user interface at 1602. View 1700, FIG. 17 shows the information associated with selection of Location 1702. FIGS. 18-20 likewise show views associated with selection of respective hierarchical groups. FIG. 22 is another example view of targeting information 2200. View 2200 displays information on each applicable hierarchical group and membership information on each group via a visual indicator associated with each group. In one example, each visual indicator (e.g., 2202-2210) can be sized relative to the associated information (e.g., membership numbers).

According to other embodiments, the user interface can include additional detailed displays of advertising metrics and/or data associated with managing an advertising network or campaign. FIGS. 22-31 illustrate various examples of user interfaces and organization of detailed advertising metrics.

Figure 24B:
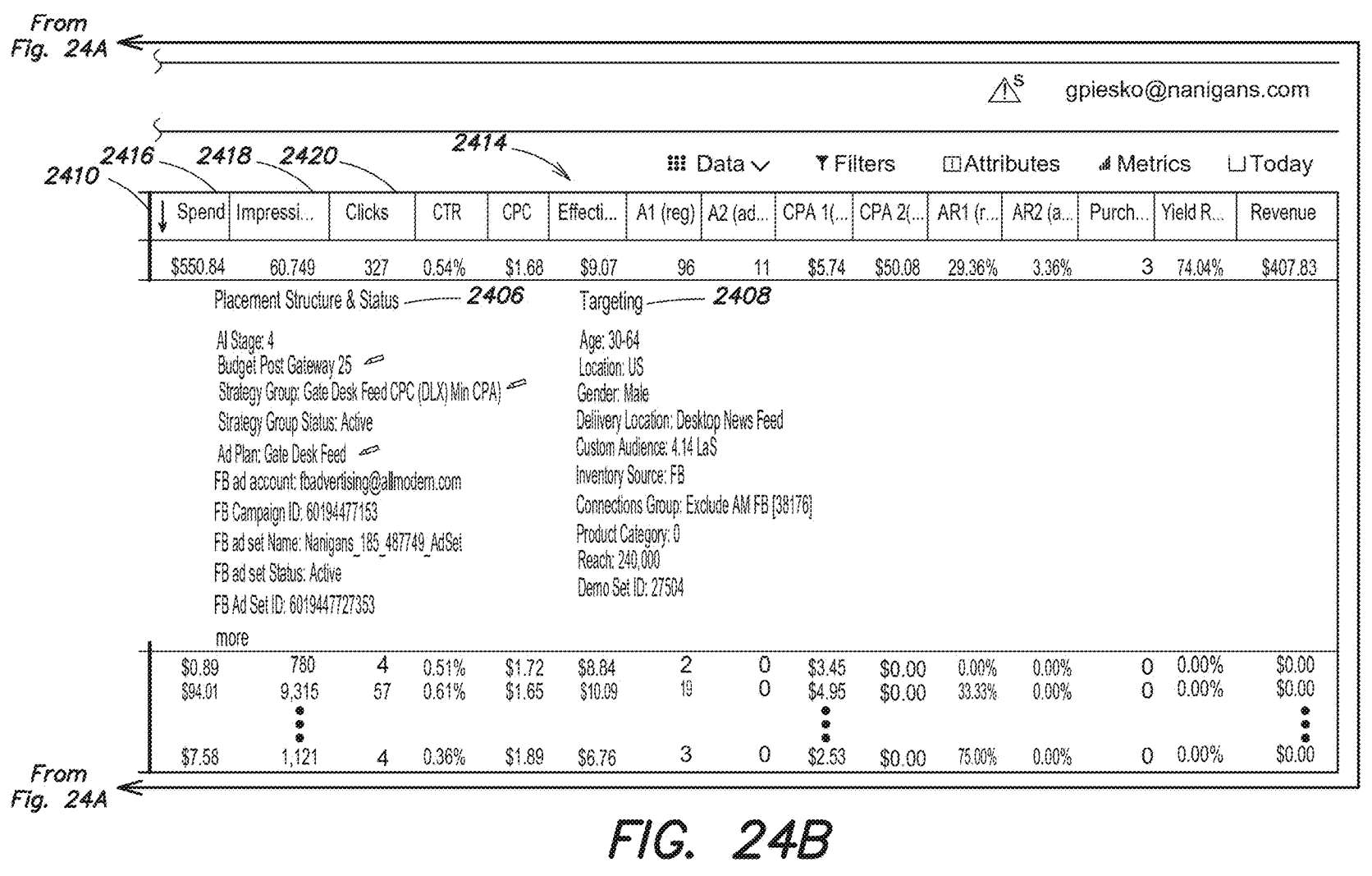
Figure 25A:
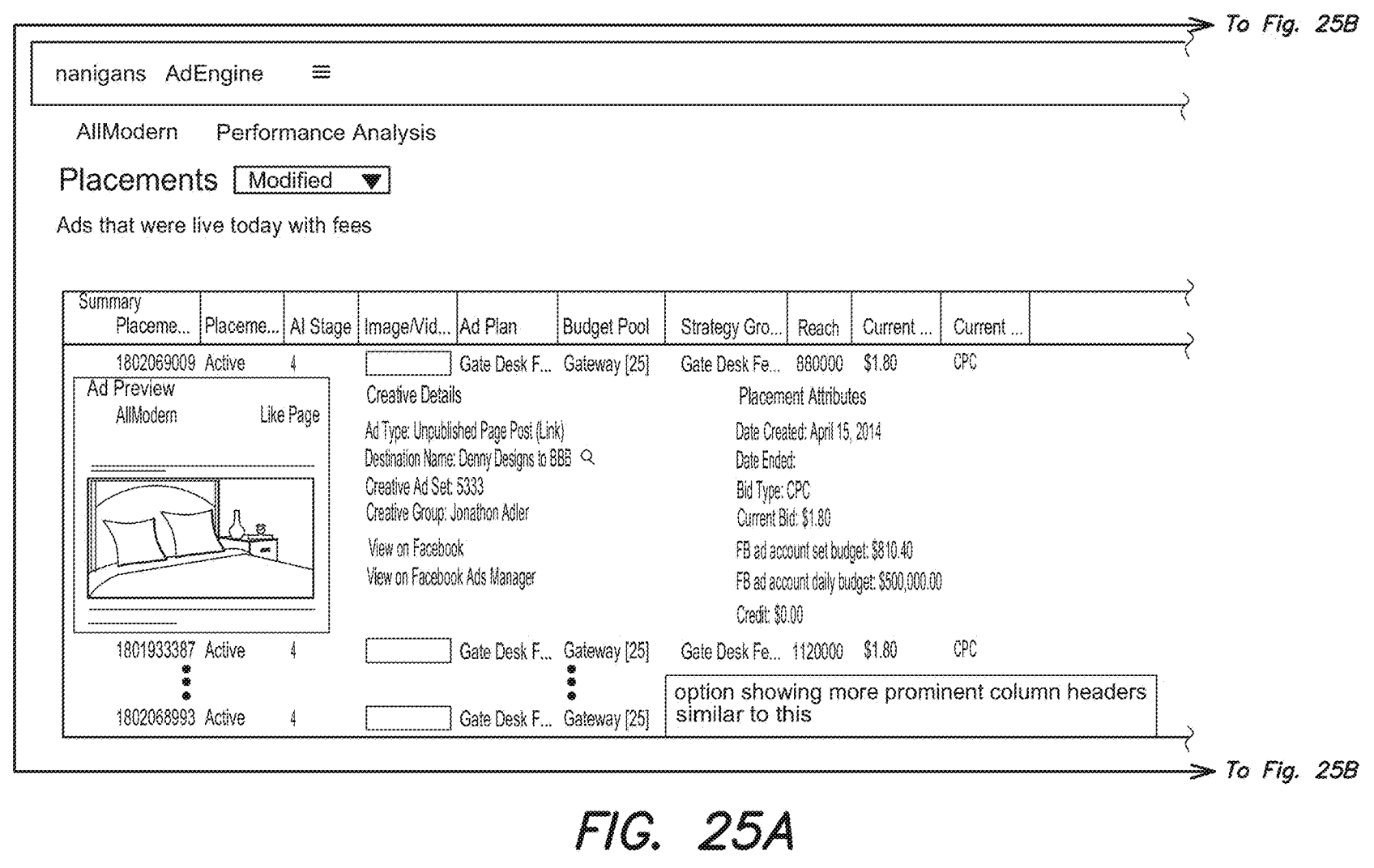

Shown at FIGS. 24-28 26-30 are examples of summary inline displays that can be accessed by users while in the detailed views. In one example, FIG. 24 shows a performance view within a pivot table that is configured to display performance data associated with particular advertisements. Actions may be performed with particular entries based on the selected ad placement. For example, in the interface shown in page 24, a right click of a pointing device over a particular selected placement in the displayed data-centric pivot table, cause the system to perform one or more actions. For instance, a "Placement Summary" action may be selected that permits the user to see specific information associated with a particular ad (e.g., FIG. 24 shows the result of a selection of the "Placement Summary" option within the interface). Such a summary may include a preview of the ad, details relating to the creative, placement attributes, placement structure and status, and targeting information associated with this particular ad, among other ad summary information.

Other actions may be selected, including a menu option to access detailed logging activity. In one examples, a menu titles can specify "AI Logs" (e.g., at 2204 in FIG. 22), which transitions the system to detailed logging information tracked by the system showing the automatic placement of ads according to artificial intelligence functions. More generally, various embodiments of the system are configured to tailor machine learning algorithms based on prior user's data. In one example, selections made in the user interface are tracked by the system constrained by a current state of the system that is associated with each selection. Machine learning matching and/or fitting can be used to predict what information subsequent users will find useful by matching similar or same states to various subsequent user contexts. The system can be configured to include matching information fields based on such learning algorithms. In some examples, user interface views can be tailored to highlight such fields, and/or tailored to include or exclude information fields based on matching.

Further, other actions may be performed, such as applying additional filters to the display (e.g., via the "Add Filters" action), isolating or eliminating certain ad placements from the display (e.g., via the "Only show this Placement ID" action or the "Exclude this Placement ID" action), or displaying detailed placement performance relating to the selected ad placement (e.g., via the "Placement Performance" action).

The summary overlays displays aggregate the information being viewed in the detailed view organized based on the management function (e.g., FIG. 24 Creative Details 2402, Placement Attributes 2404, Placement Structure & Status 2406; and Targeting 2408) for a selected advertisement. FIG. 24 illustrates an example in-line user interface element introduced into a table based visualization of placement data (e.g., data-centric pivot table). As shown the inline display is configured to span the length of a row and expand automatically the height of a row to accommodate the in-line display. Multiple in-line displays can be accessed in the user interface and can facilitate direct comparison without requiring the user to navigated through other screens to have access to the same comparison information. The inline display can also be configured to be navigable, for example, FIGS. 4A, 4B-21 show additional embodiments of example displays that can be access from table based views and inline line displays similar to FIG. 24. In other embodiments, the views shown in FIG. 4A, 4B-FIG. 21 can be displayed as an overlay window, shown in proximity (e.g., just below or above) a row in a table based view of associated detailed placement data so that the detailed placement data is shown as context in conjunction with the overlay windows.

According to one embodiment, a visual indication of a separator bar 2410 is shown. The user interface can be configured to be responsive to user actions associated with repositioning the separator 2410, so that a first portion of the display 2412 and a second portion of the display 2414 can be dynamically manipulated. For example, in response to the translation of the separator 2410 (e.g., moving the separator 2410 left or right in the display), additional advertisement data or metrics can be hidden or displayed in either of the first portion 2412 or the second portion of the display 2414. FIG. 24 shows advertisement metrics 2416-2420 as including spend data 2416, impressions 2418, and clicks 2420, among other data columns of the tabular display. The first portion of the display can include metrics such as placement identifier 2422, placement status 2424, image 2425, Ad Plan 2426 (e.g., hierarchical grouping of placements and budget groups), budget pool 2428 (e.g., hierarchical grouping of placements based on common budget), strategy group (e.g., hierarchical grouping of placements under common management control), audience information 2430 (e.g., reach—showing number of discrete or not users shown placement), current bid 2432, and current spend limit basis 2434 (e.g., cost per click).

In some embodiments, translation of the separator 2410 can trigger the user interface to automatically resize information displayed in the first and/or second portion of the view in the display, and in some examples, enable the user interface to continue to visualize the current advertising parameters 2416-2420, while introducing additional relevant information in the first portion of the display by manipulating the separator 2410. In some embodiments, detailed information fields are ordered automatically by the system and responsive to manipulations of the separator 2410, the detailed information is introduced into the display based on the system based ordering (e.g., spend 2416, impressions 2418, clicks 2420, etc.). In some alternatives, the system and/or user interface retains information on any modifications to a view that and end user selects, including for example, user specified ordering of column and/or selection/exclusion of columns to be displayed. In one example, the modifications to the view (e.g., data ordering, selected data elements, removed data elements, separator position, etc.) can be retained as a temporary view. The temporary view can be preserved across multiple logins, etc. but can also be subject to any latter modifications. In further embodiments, any changes a user wishes to maintain can be saved as user named views and made accessible through the user interface.

According to one embodiment, the operation/translation of separator bar 2410 is configured to operate only on the first portion and second portion of the user interface. In one example, the separator 2410 does not affect the display of an integrated summary view regardless of resizing the first portion and/or second portion of the display.

Figure 32:
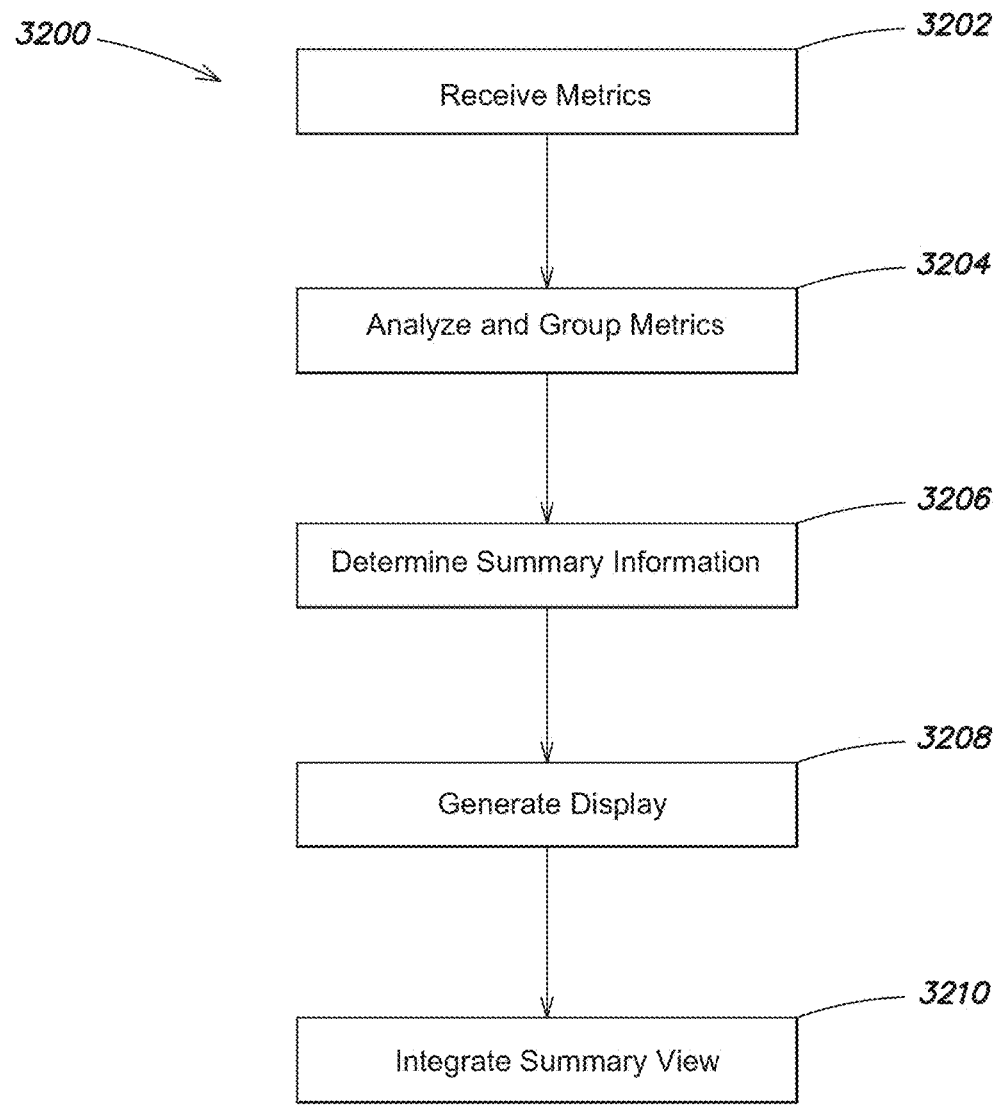

FIG. 32 illustrates an example process for displaying summary information contextually. Process 3200 beings with receiving, advertising metrics from at least one API connected to a third party content provider at 3202. Where the metrics can be analyzed and grouped at 3204 into an advertising demographic hierarchy. In some embodiments, part of the analysis at 3204 can include determining summary information for the advertising metrics in each level of the advertising demographic hierarchy (e.g., advertising location, advertising target, advertising type, age group, budget pool, strategy group, ad set, individual placement, gender, custom audience, relationship, among others) or in others determining summary information can be a separate step 3206. Process 3200 continues with generating a navigable user interface display at 3208 comprising at least one selectable drawer associated with a hierarchical group of advertising metrics (e.g., site, budget pool, strategy group, ad set, placement, among other options), wherein the at least one selectable drawer includes a display of a title of a respective hierarchical group. When selected the at least one selectable drawer is associated with a respective summary view of the advertising metrics within the hierarchical group that is then displayed. In one embodiment, responsive to selection of a view summary data control, process 3200 continues at 3210 with integrating the summary view into a first display of advertising metrics arranged in a tabular format. In one example, integrating occurs responsive to user selection in the user interface (e.g., of a view summary data control), In another example, the act of integrating into the first display optionally includes expanding a row of the tabular format to accommodate the summary view, and spanning the summary view across a plurality of columns of the first view.

Figure 26A:
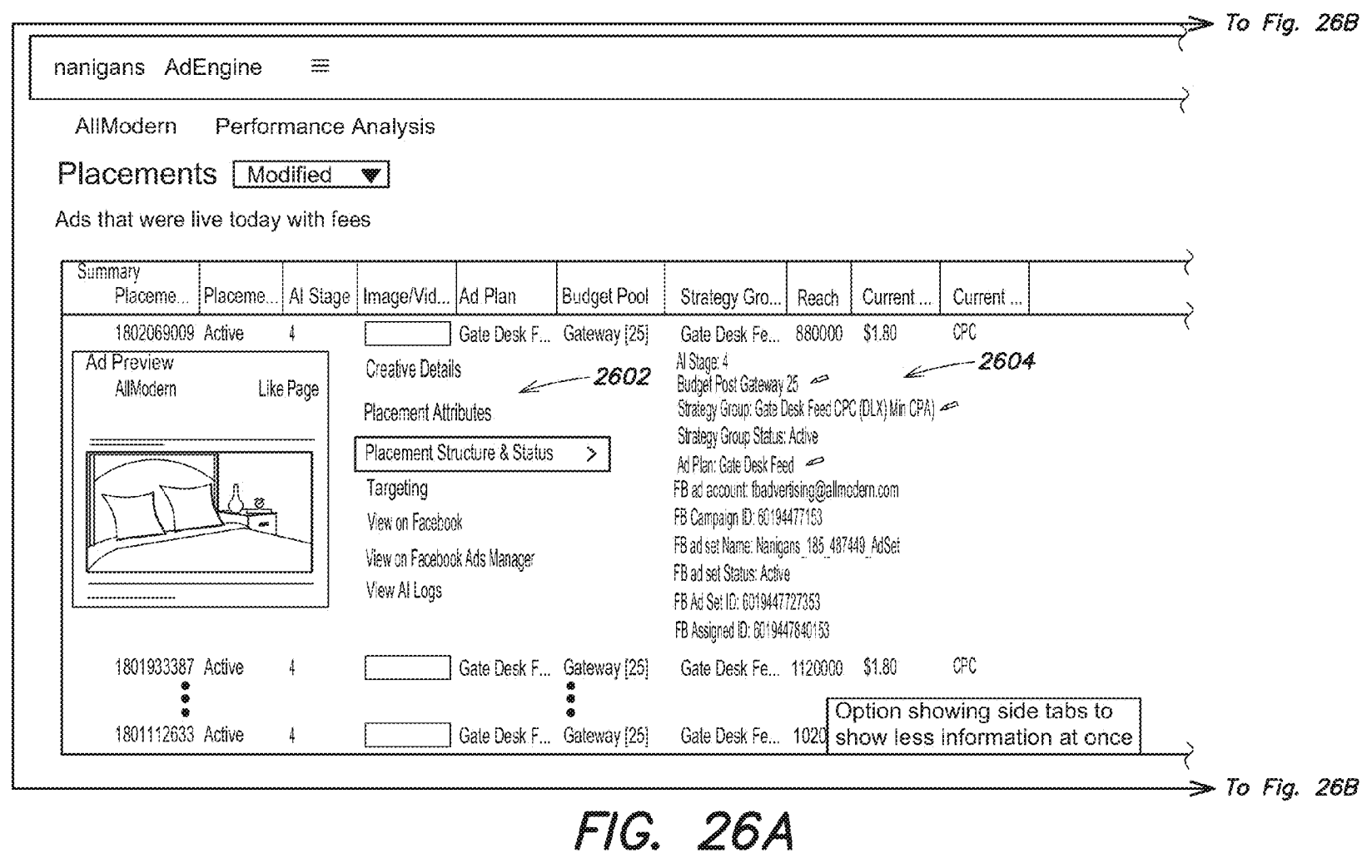
Figure 30:
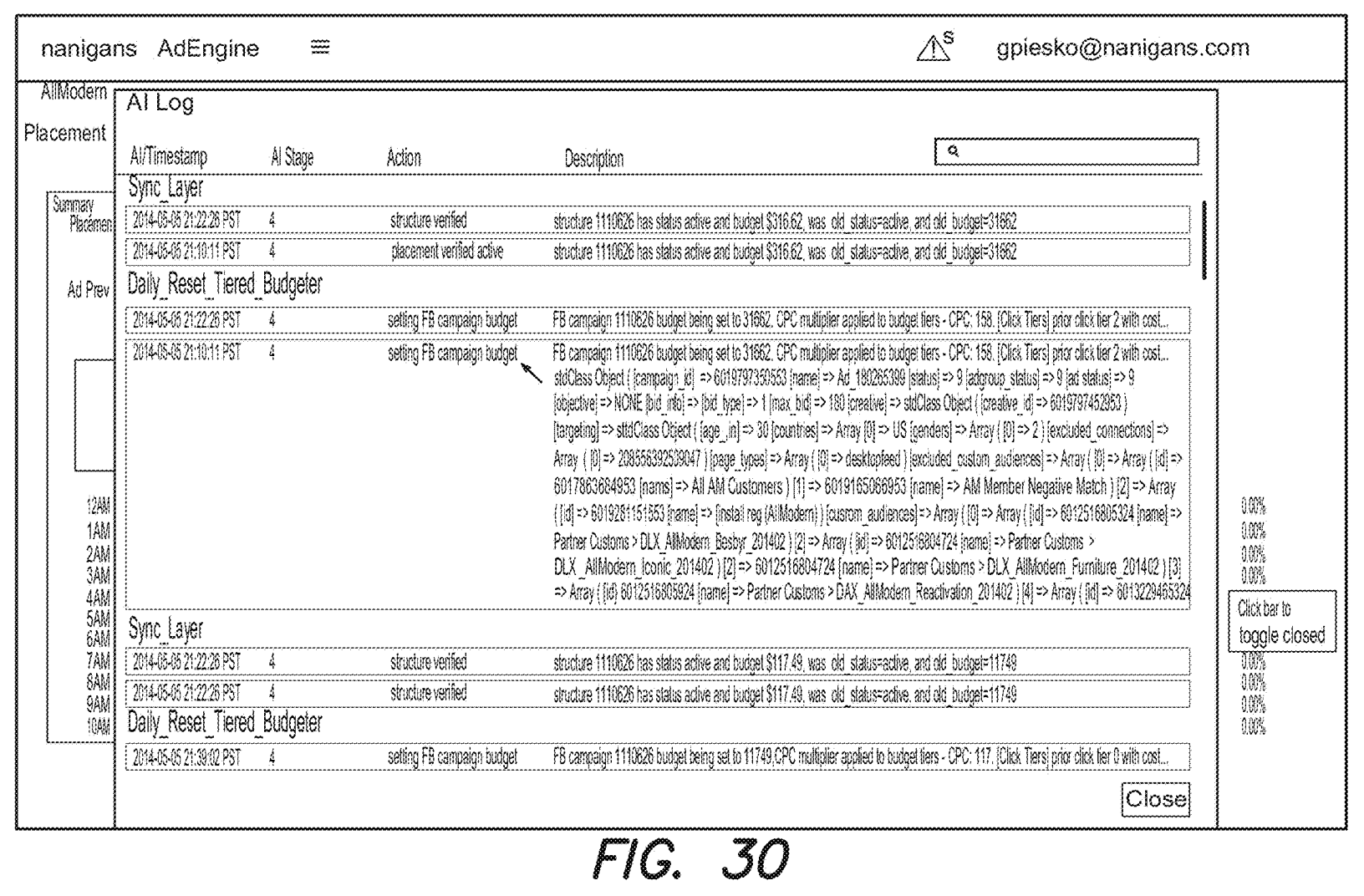

FIG. 26 illustrates another example display structure for a display focused on reducing information overload by only displaying information in one group selected at 2602, which can be displayed responsive to selection of that group (e.g., at 2604). FIGS. 29-30 display example views of detailed information for a particular advertisement or advertising group based on received advertising metrics that are analyzed and/or summarized by the system into the preceding displays.

Figure 31A:
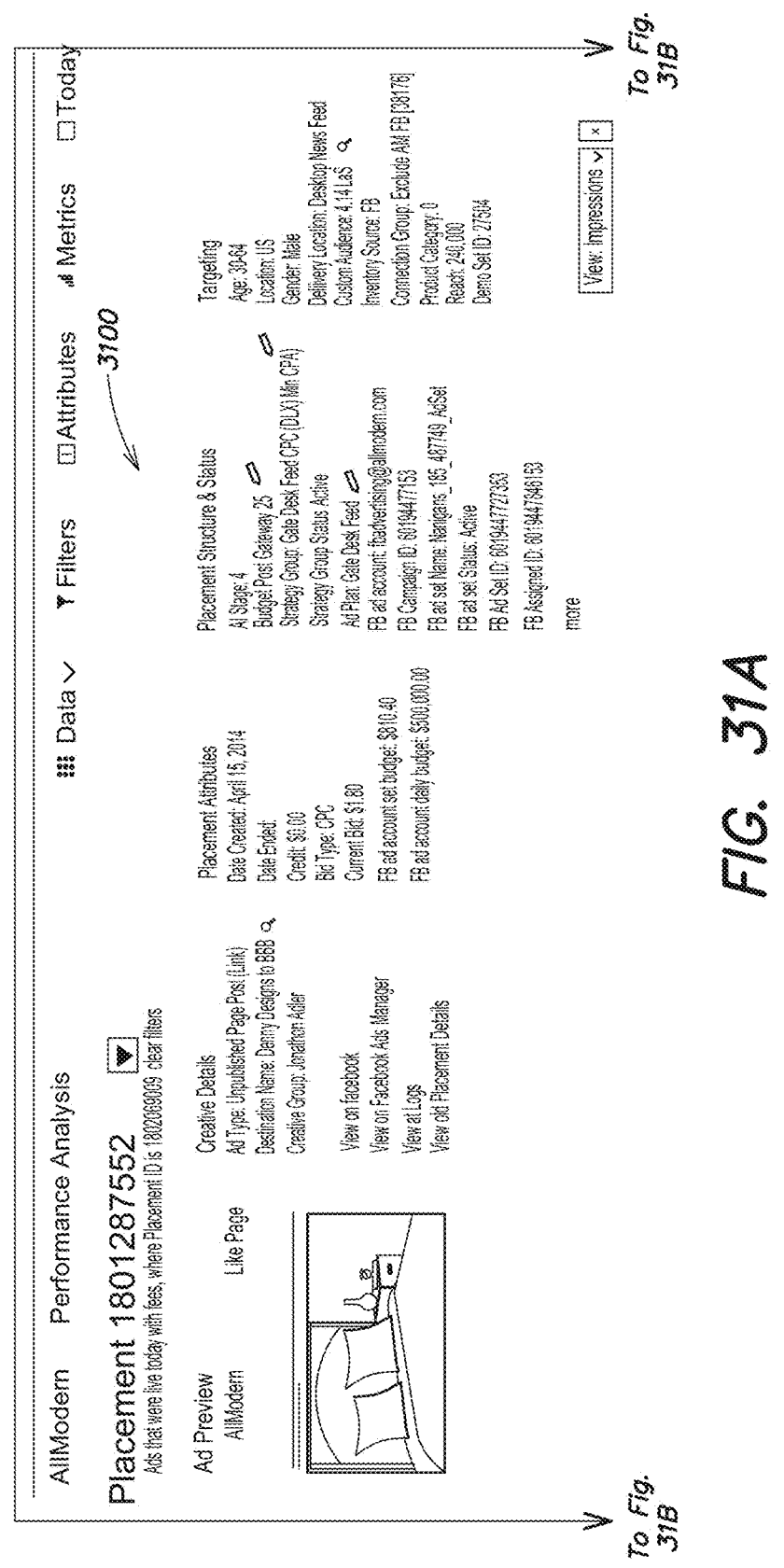
Figure 31B:
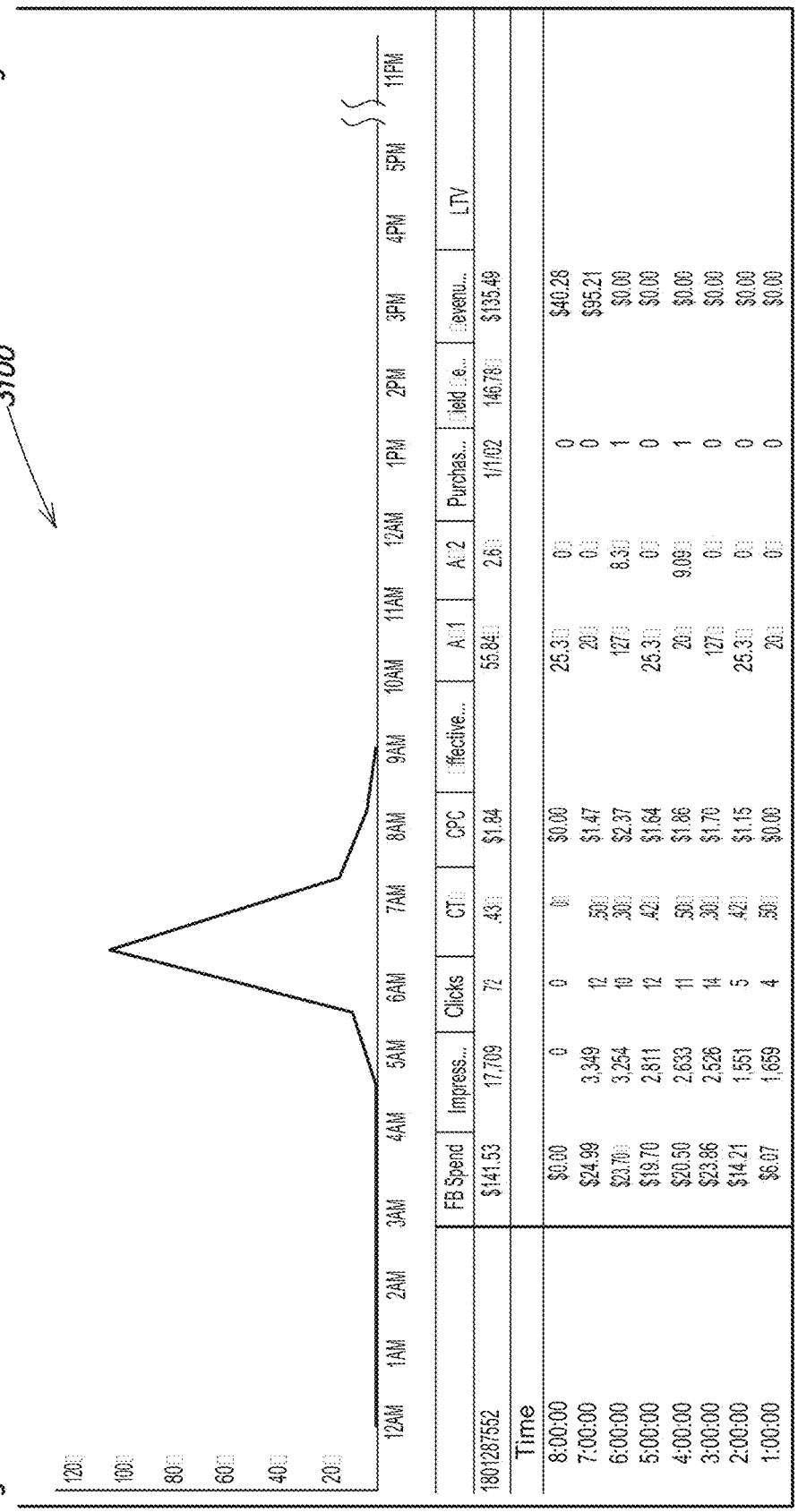

In other examples, summary information views can be combined with other graphical summarization information. For example, FIG. 31 illustrates and example view 3100 combining summary information views with detailed graphical analysis of a particular advertisement. The user interface simplifies comparison of summary information (which can be used as a benchmark) with individual performance (e.g., over time).

In some examples, the system and/or user interface facilitates the consumption of large volumes of data associated with advertisement placement and execution. For example, the user interface provides a placement summary (e.g., FIG. 24) that users can access to view granular information on the creative (e.g., 2402), placement attributes (e.g., 2404, ad structure (e.g., 2406), and targeting (e.g., 2408) detail for individual ads. When comparing ad performance, the placement summary can be used to view attributes of any ad such as, delivery location, audiences you are targeting, bid type, bid amount, among other information.

Another option provided in some embodiments includes visualizations of the performance of an individual placement over time. In one example, selection in the user interface triggers the system to display a table and chart of how that ad placement performed over time. The display can dynamically refresh during viewing as additional advertising metrics are received by the system. In one example, the placement summary also provides additional information such as, logged information that allows a user to see more detail about optimization logic applied to a placement. In one embodiment, the logged information includes system automated tuning selections and/or updates made on existing placements. For example, machine learning algorithms are configured to optimize return on spend (e.g., by optimizing for click through, conversion, sales, etc. relative to dollars spent). In addition, the user can also view ad placement on advertising platforms (e.g., Facebook) to see comments, likes, and shares.

According to another aspect, generation of logical groupings of advertising types provides selectable options in the user interface that facilitate advertising management. Each grouping is responsive to mouse over operations to display information for matching. The Ad Type groupings remain the same across any view, and are selectable within the user interface to display how each ad will be presented on Facebook.

In various examples, extremely long urls are handled by the system by creating shorter visualizations of the long urls.

Example Systems and Interfaces

Interfaces to various system embodiments, may include functions such as those discussed above in relation to (FIGS. 1 and 2) for performing ad creation, optimization, and viewing analytics for data driven ad management. The interfaces may be browser-based applications written in a variety of programming language including, but not limited to Java, Javascript, PHP, among others. Such an architecture (e.g., the data analytics and workflow architecture: (e.g., shown in FIG. 2C) may be designed to handle many events in a scalable manner. Raw data may be stored in a relational database (e.g., MySQL) as the vast majority of the data is relational in nature and databases such as MySQL provide ACID transactions. To achieve the performance required and support multi-tier pivoting, the system may be configured to load all of the required MySQL data into memory. In one embodiment, the system may break the information into two types:

Placement metadata such as creative, and audience
Performance time based data

Placement metadata may be stored in memory and, according to one embodiment, the data is immutable. Loading this data often requires joins across many tables and can be slow, however, it is appreciated that once in memory, the data can be accessed very quickly. Recent performance data may be kept in memory while older data is retained based on user access. The data may be refreshed regularly, or changes to data may be streamed into the architecture to ensure the query results represent real-time metrics.

The query engine acts upon the data in memory using data agnostic actions (i.e. group, sort, where, having). It is noted that, according to one implementation, the data model and data access layers are completely decoupled from the query engine. The paths given to the query engine refer to fields within the object using reflection and support expressions against those fields. This allows for using the architecture to analyze other future data objects beyond just placements. The query engine may use a procedural language to process the data. Below is an example:

GET(1234)
WHERE(EQUAL,placement.audience.minage,15)
GROUP(placement.audience.gender,placement.creative.title)
SORT(0,placement.creative.image,DESC,placement.bidtype,ASC)
ATTACH(1234,TODAY,HOUR)
HAVING(1,GREATER_THAN,placementperformance.clicks/placementperformance.impressions,0.5)

In this case, placement metadata for site 1234 is utilized and first filters out any placements whose audience minimum age is 15. The results are then grouped by audience gender and creative title and sorted by image and bid type. Attach( ) then combines metadata with today's time based performance data and groups it by hour. Finally, the having step filters any aggregate data for each hour to only include those whose click through rate is greater than 50%. data is represented as a tree with aggregate summaries at each non-leaf node. The result is that loading placement analysis for a customer in a conventional architecture with 1 million placements would take between 20-30 minutes, while the data analysis architecture is capable of executing a more complex query in under 2 seconds.

Various aspects and functions described herein may be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 33:
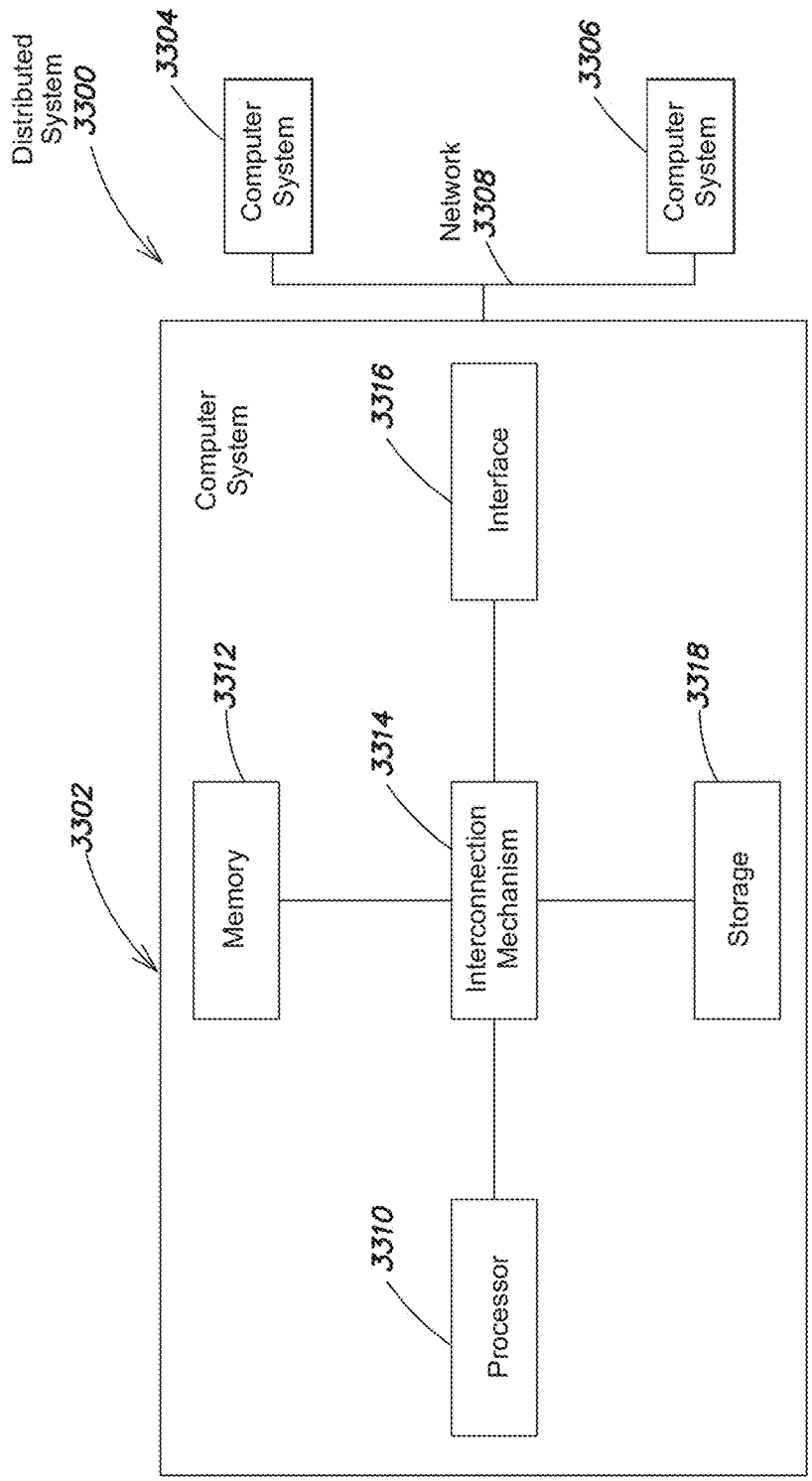

For example, various aspects, functions, and processes may be distributed among one or more computer systems configured to provide a service to one or more client computers, or to perform an overall task as part of a distributed system, such as the distributed computer system 3300 shown in FIG. 33. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 33, there is illustrated a block diagram of a distributed computer system 3300, in which various aspects and functions are practiced. As shown, the distributed computer system 3300 includes one or more computer systems that exchange information. More specifically, the distributed computer system 3300 includes computer systems 3302, 3304, and 3306. As shown, the computer systems 3302, 3304, and 3306 are interconnected by, and may exchange data through, a communication network 3308. The network 3308 may include any communication network through which computer systems may exchange data. To exchange data using the network 3308, the computer systems 3302, 3304, and 3306 and the network 3308 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 3302, 3304, and 3306 may transmit data via the network 3308 using a variety of security measures including, for example, SSL or VPN technologies. While the distributed computer system 3300 illustrates three networked computer systems, the distributed computer system 3300 is not so limited and may include any number of computer systems and computing devices, networked using any medium and communication protocol.

As illustrated in FIG. 33, the computer system 3302 includes a processor 3310, a memory 3312, an interconnection element 3314, an interface 3316 and data storage element 3318. To implement at least some of the aspects, functions, and processes disclosed herein, the processor 3310 performs a series of instructions that result in manipulated data. The processor 3310 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 3310 is connected to other system components, including one or more memory devices 3312, by the interconnection element 3314.

The memory 3312 stores programs (e.g., sequences of instructions coded to be executable by the processor 3310) and data during operation of the computer system 3302. Thus, the memory 3312 may be a relatively high performance, volatile, random access memory such as a dynamic random access memory ("DRAM") or static memory ("SRAM"). However, the memory 3312 may include any device for storing data, such as a disk drive or other nonvolatile storage device. Various examples may organize the memory 3312 into particularized and, in some cases, unique structures to perform the functions disclosed herein. These data structures may be sized and organized to store values for particular data and types of data.

Components of the computer system 3302 are coupled by an interconnection element such as the interconnection element 3314. The interconnection element 3314 may include any communication coupling between system components such as one or more physical busses in conformance with specialized or standard computing bus technologies such as IDE, SCSI, PCI and InfiniBand. The interconnection element 3314 enables communications, including instructions and data, to be exchanged between system components of the computer system 3302.

The computer system 3302 also includes one or more interface devices 3316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 3302 to exchange information and to communicate with external entities, such as users and other systems.

The data storage element 3318 includes a computer readable and writeable nonvolatile, or non-transitory, data storage medium in which instructions are stored that define a program or other object that is executed by the processor 3310. The data storage element 3318 also may include information that is recorded, on or in, the medium, and that is processed by the processor 3310 during execution of the program. More specifically, the information may be stored in one or more data structures specifically configured to conserve storage space or increase data exchange performance. The instructions may be persistently stored as encoded signals, and the instructions may cause the processor 3310 to perform any of the functions described herein. The medium may, for example, be optical disk, magnetic disk or flash memory, among others. In operation, the processor 3310 or some other controller causes data to be read from the nonvolatile recording medium into another memory, such as the memory 3312, that allows for faster access to the information by the processor 3310 than does the storage medium included in the data storage element 3318. The memory may be located in the data storage element 3318 or in the memory 3312, however, the processor 3310 manipulates the data within the memory, and then copies the data to the storage medium associated with the data storage element 3318 after processing is completed. A variety of components may manage data movement between the storage medium and other memory elements and examples are not limited to particular data management components. Further, examples are not limited to a particular memory system or data storage system.

Although the computer system 3302 is shown by way of example as one type of computer system upon which various aspects and functions may be practiced, aspects and functions are not limited to being implemented on the computer system 3302 as shown in FIG. 33. Various aspects and functions may be practiced on one or more computers having a different architectures or components than that shown in FIG. 33. For instance, the computer system 3302 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 3302 may be a computer system including an operating system that manages at least a portion of the hardware elements included in the computer system 3302. In some examples, a processor or controller, such as the processor 3310, executes an operating system. Examples of a particular operating system that may be executed include a Windows-based operating system, such as, Windows NT, Windows 2000 (Windows ME), Windows XP, Windows Vista or Windows 7, 8, or 10 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 3310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover one selection from A, B, C (e.g., A), two selections from A, B, C (e.g., A and B), three selections (e.g., A, B, C), and multiples of each selection.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A user interface for generating and displaying high data volume analytics, the user interface comprising:
    a user interface component, executed by at least one processor, operable to display at least one user interface, wherein the at least one user interface is configured to display and accept information associated with a plurality of placements, including:
        a first view operable to access and display placement metrics associated with the plurality of placements, including information indicating performance information associated with live placements being executed on third party systems;
        wherein the first view is configured to access the performance information retrieved by at least one application programming interface(API) from the third party systems;
        wherein the first view is generated in a tabular format and displayed with a plurality of rows associated with respective placements, and each column of the tabular format dynamically configured to be selectable by the user and responsive to selection of data dimensions to limit or expand displayed information;
        wherein the first view is organized into a first and second portion:
            the first portion including in a default view, columns for at least a placement identifier, a placement status, an associated image, a first hierarchical layer, a second hierarchical layer, or audience information; and
            the second portion including in another default view, columns for visualizing or deriving spend information, viewer activity, and revenue from individual placements;
        a divider visualization in the first view, the divider visualization configured to trigger manipulation of a sizing and display number of columns in the first and second portions of the first view responsive to movement of the divider visualization; and
        a summary view associated with a respective placement, wherein the summary view is configured to integrate into the first view responsive to a user selection in the at least one user interface, wherein the integration includes:
            dynamically introducing a row into the tabular format adjacent to a row associated with the respective placement;
            expanding a height of the row introduced into the tabular format; and
            displaying the summary view in the row introduced into the tabular format, wherein the summary view spans the first and second portions of the first view.

2. A user interface for generating and displaying high data volume analytics, the user interface comprising:
    at least one processor operatively connected to a memory, the at least one processor when executing, is configured to:
    receive advertising metrics;
    analyze and group the advertising metrics into a demographic hierarchy;
    determine summary information for the advertising metrics in at least one level of the demographic hierarchy;
    generate a summary view including at least a navigable user interface portion, the summary view comprising:
        a plurality of selectable drawers, at least one of the plurality of selectable drawers associated with a respective hierarchical group of advertising metrics, wherein:
            the at least one selectable drawer includes a display of a title of a respective hierarchical group; and the at least one selectable drawer is associated with a respective summary view of the advertising metrics within the hierarchical group;
responsive to a user selection in the user interface, integrate the summary view into a first display of advertising metrics, the first display arranged in a tabular format, wherein integration into the first display includes:
dynamically inserting a row into the tabular format;
expanding the row inserted into the tabular format to accommodate the summary view;
rendering the summary view within the expanded row; and
spanning the summary view across a plurality of columns of the tabular format;
generate a divider visualization; and
manipulate the first display of advertising metrics responsive to movement of the divider visualization.

3. The user interface of claim 2, wherein the at least one processor is configured to display for the plurality of selectable drawers a membership number associated with the respective hierarchical group.

4. The user interface of claim 2, wherein the at least one processor is further configured to include, in the tabular format, selectable data dimensions for respective placements organized by row, wherein the row based organization enables a selectable pivot table display.

5. The user interface of claim 4, wherein the at least one processor is further configured to:
responsive to user specification of data dimensions, re-render the pivot table display dynamically.

6. The user interface of claim 2, wherein expanding the row inserted into the tabular format comprises expanding a default display width of the row to accommodate the summary view.

7. The user interface of claim 2, wherein the summary view includes first horizontal menu configure to accept selection of an object hierarchy, object definition, and audience information for the object.

8. The user interface of claim 7, wherein the summary view includes a default first view rendering the object hierarchy and associated plurality of selectable drawers, each drawer associated with a respective hierarchical group of advertising metrics.

9. The user interface of claim 8, wherein the plurality of selectable drawers comprise a vertically oriented menu selectable in the summary view to transition a body portion of the summary view between visualizations of respective hierarchy information.

10. The user interface of claim 9, wherein the summary view includes a first preview portion, an adjacent vertical menu portion, and a body portion for displaying data according to selection in the vertical menu portion.

11. The user interface of claim 2, wherein the at least one processor is further configured to:
generate a portion of a display screen, wherein each data element of the tabular format is selectable by an end user, and
dynamically generate performance information views in the portion of the display screen responsive to user selection of one or more data dimensions.

12. The user interface of claim 4, wherein the at least one processor is further configured to generate at least a portion of a display organizing placement performance information based on multi-dimensional groupings of the placement data.

13. The user interface of claim 5, wherein the at least one processor component is further configured to:
access historical advertising metrics;
display and group the historical advertising metrics into an advertising demographic hierarchy.

14. The user interface of claim 2, wherein the at least one processor is further configured to:
access a first display set of metric data associated with placements under management;
partition the first display set of metric data into ordered partitions until a first partition of the ordered partition is capable of being rendered on end user device in a threshold period of time; and
render a visualization of the first display limited to the first partition of placement data and respective data fields from the first display set.

15. The user interface of claim 14, wherein the at least one processor is further is configured to display a scroll tool configured to trigger loading of a second partition of the order partitions responsive to scrolling to the end of the first partition of data.

16. The user interface of claim 15, wherein the scroll tool is further configured to trigger loading of the second partition of the ordered partitions responsive to approaching the end of the first partition of data.

17. The user interface of claim 2, wherein the at least one processor is configured to manipulate the first display of advertising metrics responsive to lateral translation of the divider visualization.

18. The user interface of claim 2, wherein the at least one processor is further configured to reorder at least some of the advertising metrics in the tabular format responsive to movement of the divider visualization.

* * * * *